(12) United States Patent
Smeeton et al.

(10) Patent No.: US 12,498,668 B2
(45) Date of Patent: Dec. 16, 2025

(54) LIGHT SHUTTERING FOR WAVEGUIDE PUPIL EXPANSION

(71) Applicant: Envisics Ltd, Milton Keynes (GB)

(72) Inventors: Timothy Smeeton, Milton Keynes (GB); Edward Boardman, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 111 days.

(21) Appl. No.: 18/168,244

(22) Filed: Feb. 13, 2023

(65) Prior Publication Data

US 2023/0288870 A1    Sep. 14, 2023

(30) Foreign Application Priority Data

Mar. 9, 2022 (GB) ...................................... 2203272

(51) Int. Cl.
*G03H 1/22* (2006.01)
*G02F 1/133* (2006.01)

(52) U.S. Cl.
CPC ....... *G03H 1/2205* (2013.01); *G02F 1/13306* (2013.01); *G03H 1/2294* (2013.01); *G03H 2001/2239* (2013.01)

(58) Field of Classification Search
CPC .................................................. G03H 1/2205
See application file for complete search history.

(56) References Cited

U.S. PATENT DOCUMENTS

| | | | |
|---|---|---|---|
| 2011/0241978 A1 | 10/2011 | Fergason | |
| 2013/0222384 A1 | 8/2013 | Futterer | |
| 2015/0248790 A1 | 9/2015 | Schowengerdt | |
| 2018/0188528 A1 | 7/2018 | Browy et al. | |
| 2018/0321524 A1* | 11/2018 | Li | G02F 1/13306 |
| 2019/0204642 A1* | 7/2019 | Song | G02F 1/1347 |

FOREIGN PATENT DOCUMENTS

| | | |
|---|---|---|
| EP | 0 136 085 B1 | 6/1988 |
| GB | 2589575 A | 6/2021 |
| TW | 201819991 A | 6/2018 |

OTHER PUBLICATIONS

Search and Examination Report issued in application GB 2203272.6 dated Sep. 7, 2022 (6 pages).
Office Action issued in application TW 112105344 dated Feb. 22, 2024 (7 pages).

(Continued)

*Primary Examiner* — Edmond C Lau
(74) *Attorney, Agent, or Firm* — Akerman LLP

(57) ABSTRACT

A light shuttering device comprises a plurality of liquid crystal cells, wherein each liquid crystal cell is operable in a first optical state or a second optical state in response to a respective first or second drive signal. A drive circuit comprises a plurality of switches and a drive controller. Each switch is arranged to output the respective first or second drive signal to a respective liquid crystal cell. The drive controller is arranged to sequentially update the output of each switch during an update cycle. The drive circuit is arranged to determine the order in which the switches are sequentially updated during an update cycle based on any changes to the respective drive signals that will be made during the update.

10 Claims, 19 Drawing Sheets

(56) References Cited

OTHER PUBLICATIONS

English translation of Office Action issued in application TW 112105344 dated Feb. 22, 2024 (7 pages).
Extended European Search Report issued in application EP 23158497.0 dated Jul. 4, 2023 (9 pages).
Office Action issued on Jan. 9, 2025 in application KR 10-2023-0030705 (14 pages).
English translation of Office Action issued on Jan. 9, 2025 in application KR 10-2023-0030705 (14 pages).

* cited by examiner

LIGHT SHUTTERING FOR WAVEGUIDE PUPIL EXPANSION

CROSS-REFERENCE TO RELATED APPLICATIONS

This application claims priority under 35 U.S.C. § 119 to UK Patent Application GB 2203272.6, titled "Light Shuttering for Waveguide Pupil Expansion," filed on Mar. 9, 2022, and currently pending. The entire contents of GB 2203272.6 are incorporated by reference herein for all purposes

FIELD

The present disclosure relates to image projection. More specifically, the present disclosure relates to holographic projection. Some embodiments relate to virtual image projection. Other embodiments relate to projection of a real image. Embodiments relate to viewing a projected image through a waveguide. Embodiments relate to a control device, such as a light shuttering device, and method for controlling light of an image that is projected through a waveguide. Some embodiments relate to a display system comprising a picture generating unit and a waveguide arranged with a light shuttering device. Some embodiments relate to a head-up display.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LIDAR", for example.

SUMMARY

Aspects of the present disclosure are defined in the appended independent claims.

The present disclosure relates to image projection. It relates to a method of image projection and an image projector which comprises a display device. The present disclosure also relates to a projection system comprising the image projector and a viewing system. The present disclosure is particularly applicable to a binocular viewing system. The viewing system may comprise a viewer's eye or eyes. The viewing system comprises an optical element having optical power (e.g. lens/es of the human eye) and a viewing plane (e.g. retina of the human eye/s). The image projector may be referred to as a "display system" or a "light engine". The display device and the image formed (or perceived) using the display device are spatially separated from one another. The image is formed, or perceived by a viewer, on a display plane. In some embodiments, the image is a virtual image and the display plane may be referred to as a virtual image plane. The image is formed by illuminating a diffractive pattern of a diffractive structure (e.g., hologram) displayed on a display device, such as a spatial light modulator (e.g. LCOS spatial light modulator).

Our co-pending UK patent application GB2108456.1 filed on 14 Jun. 2021 entitled "Waveguide Pupil Expansion", which is hereby incorporated by reference, discloses examples of such a projection system. The projection system uses a waveguide in the optical path between the image projector and the viewing system. The waveguide operates to expand the field of view, and therefore increase the maximum propagation distance over which the full diffractive angle of the display device may be used. Use of a waveguide can also increase the user's eye-box laterally, thus enabling some movement of the eye(s) to occur, whilst still enabling the user to see the image. The waveguide may therefore be referred to as a waveguide pupil expander.

In the projection system disclosed in GB2108456.1, the display device displays a special type of hologram that is configured to route light into a plurality of channels, referred to as "hologram channels", in which each channel corresponds to a different part (i.e. sub-area) of an image. Each hologram channel is emitted from each of multiple different transmission points on the waveguide, towards the viewing system, such that light of the same hologram channel propagates from each transmission point at the same angle, or range of angles. Thus, each hologram channel may be referred to as an "angular channel". In other words, each hologram channel may comprise spatially modulated light in accordance with a different respective part of the image, and thus corresponds to different respective image content. Light of the same image content may be emitted from multiple different transmission points on the waveguide, all at the same angle, or within the same angular range, relative to a surface of the waveguide, even though the transmission points are spatially separated from one another along the length of the output surface forming the "output port" of the waveguide.

The projection system may be arranged such that no more than one instance of each individual hologram channel reaches an individual eye, or individual viewing aperture or viewing window, of the viewing system. However, it is common for a viewing system to have multiple viewing apertures, each occupying a different location and thus each defining a different respective viewing position. For example, a human viewer typically views an image, within a viewing window or "eye-box", with two eyes that are naturally spatially separated from one another. Thus, there is a risk of a plurality instances of the light of the same (i.e., a common) hologram channel reaching a respective plurality of viewing apertures/windows (which may also be referred to as "entrance pupils") of the viewing system, substantially simultaneously. If this happened, the viewer's brain—or, the processor associated with a non-human viewing system—would perceive that both eyes (or, both or every viewing aperture) had received light of the same image content (that is, light of the same part or point of the image) at the same angle, despite the fact that those eyes or viewing apertures are themselves at different respective viewing locations. This is counterintuitive for a viewer or viewing system, as ordinarily two different viewing locations should, based on well-established mathematical principles, receive light from a common point at different respective angles.

Accordingly, GB2108456.1 proposes a control device and method for controlling light emitted by a waveguide to address this problem. Embodiments comprise a control device in the form of a "light shuttering device" that may be said to form a "waveguide aperture". The light shuttering device may be configurable to selectively block, or prevent, the propagation of spatially modulated light that are emitted by the waveguide, and to allow onward propagation of the remaining of the spatially modulated light towards the viewing system. In particular, the light shuttering device may selectively block, or prevent, the propagation of one or more channels of spatially modulated light that are emitted by the waveguide, and to allow onward propagation of one or more respective other channels, towards the viewing system. The control device may comprise one or more openings, or apertures, and one or more walls, or barriers, in order to selectively emit and block light from the waveguide. The control device may be dynamically configurable in order to select, and/or to change, which portion(s) of the control device acts as an opening and which respective other portion(s) of the control device acts as a barrier, at a given time. It may be said that the control device may comprise a plurality of "configurations" or "light blocking configurations" defining the arrangement—including size and position—of the openings and barriers. The light blocking configurations of the control device may be predetermined or determined in real time. The light blocking configurations are also referred to herein as "stages" or "phases" of the control device.

The present disclosure concerns improvements in the control device. In particular, the described control device comprises a light shuttering device positioned adjacent the external output surface (i.e. output port) of the waveguide forming the expanded exit pupil. Thus, the light shuttering device is positioned along the optical path between the waveguide and the viewing system. The improved control device may have particular application for selectively blocking light so that light of the same hologram channel, transmitted from different points on the waveguide, does not reach more than one of the entrance pupil(s) of the viewing system, at substantially the same time As described in GB2108456.1, it is desirable that the control device is arranged so that the light blocking configuration can be dynamically changed or "switched" quickly. In particular, in some implementations, it is desirable that each switchable element of the control device can be updated within a time period of less than 0.1 ms.

The light shuttering device of the present disclosure is configured as a plurality of pixels, such as a one-dimensional array of pixels, wherein each pixel forms a "shutter" for selectively blocking light from a corresponding transmission point along the length of the waveguide. In embodiments, the pixels are liquid crystal cells, operable in two optical states. In one optical state, the liquid crystal cell blocks (e.g. absorbs or reflects) incident light from a corresponding position (or region) on the waveguide, so as to prevent transmission of light. In the other optical state, the liquid crystal cell is transparent, so that incident light from a corresponding position (or region) on the waveguide is transmitted therethrough. The pixels of the light shuttering device are controlled by drive signals, as well known in the art. However, for some liquid crystal cells, such as the pixels of a thin-cell liquid crystal device, the time period to switch from a second optical state to a first optical state is longer than the time period to switch from the first optical state to the second optical state or vice versa. For example, the switching time period is longer when the liquid crystal cell "relaxes" to its new state (the first optical state) compared to when it is "driven" to its new state (the second optical state).

The present disclosure addresses the technical problem that the switching time period for pixels of a light shuttering device, when switching in a direction whereby the liquid crystal cell "relaxes" to its new state, is too long for application requirements, such that the performance is compromised. In particular, if the light shuttering device does not switch quickly enough—such as within the time period associated with switching off or "gating" the light source during frame update of the display—some of the pixels of the light shuttering device may not be updated when the display of the next image frame beings. It may be said that the update of the configuration of the light shuttering device may be incomplete. In consequence, there is a risk that light may not be correctly selectively blocked, or prevented, from propagating from the waveguide during a given frame. From example, light that should be blocked may be propagated to the viewing system and/or light that should be allowed to propagate to the viewing system may be blocked. In some examples, there is a risk that light of the same angular hologram channel may still propagate from multiple transmission points from the waveguide to the viewing system, as described above.

In accordance with the present disclosure, each pixel of the light shuttering device is directly driven by one of: a first drive signal and a second drive signal, wherein the first drive signal switches a pixel to the first optical state and the second drive signal switches the pixel to the second optical state. Furthermore, during an update cycle that updates the configuration of the light shuttering device, the order in which the pixels of the light shuttering device are driven is determined based on any changes to the respective drive signals that will be made during the update. In particular, the order in which the pixels of the light shuttering device are driven may be determined to compensate for the switching time period of the pixel. In particular, the order in which the pixels of the light shuttering device are driven may be determined so that any relatively slow state change switches are made first. In this way, the light shuttering device may advantageously be updated quickly (in particular, quickly enough to at least match the frame rate of a display device for which the light shuttering device is for use with). Thus, the risk of incorrectly blocking/transmitting portions/channels of light during any particular frame due to an incomplete update cycle of the pixels may be substantially avoided.

Accordingly, there is provided a drive circuit for driving a light shuttering device comprising a plurality of liquid crystal cells. Each liquid crystal cell is operable in a first optical state or a second optical state in response to a respective first or second drive signal. The drive circuit comprises a plurality of switches. Each switch is arranged to output the first or second drive signal to a respective liquid crystal cell. The drive circuit further comprises a drive controller arranged to sequentially update the output of each switch during an update cycle. The drive circuit is arranged to determine the order in which the digital switches are sequentially updated during an update cycle, based on any changes to the respective drive signals that will be made during the update.

The first optical state may be a transparent or "off" state of the liquid crystal cell, and the second optical state may be an opaque or "on" state of the liquid crystal cell. As the skilled person will appreciate, the liquid crystal cells may take longer to switch from the second optical state to the first optical state than from the first optical state to the second optical state. In particular, liquid crystal cells typically take longer to switch when "relaxing" into a new state, such as when changing from the second optical state to the first optical state (e.g. transitioning from opaque to transparent or "on" to "off"). Accordingly, in embodiments, the drive circuit is arranged during an update cycle to update the output of any switches that will be changed from the second drive signal to the first drive signal before any other digital switches. Thus, the liquid crystal cells that take longer to reach their new optical state are switched first during the sequential update, thereby ensuring that all the liquid crystal cells are fully updated at the end of the update cycle. In other words, the drive circuit may be arranged to compensate for the slower switching time (relaxation time) from the second optical state to the first optical state.

In embodiments, the plurality of switches comprises a plurality of digital switches. Each digital switch comprises a first input arranged to receive the first drive signal and a second input arranged to receive the second drive signal. In some examples, a capacitor is associated with each digital switch. Each capacitor is arranged to provide a control input to the respective digital switch in response to a signal from the drive controller during an update cycle, so as to selectively output the respective first or second drive signal to a respective liquid crystal cell. In this way, the capacitor holds the control input to the digital switch between updates, so that the drive signal output by the digital switch to the respective liquid crystal cell remains stable.

In some embodiments, the drive circuit further comprises a multiplexing circuit for sequentially routing control signals from the drive controller to update the output of each of the switches during an update cycle.

In embodiments, the liquid crystal cells of the light shuttering device are arranged in a one-dimensional array. In examples, the light shuttering device is arranged to restrict the area of the output face of an optical replicator (e.g. a waveguide) that is visible from a viewing plane. In implementations, the optical replicator is arranged to output a plurality of replicas of a hologram. The light shuttering device is disposed between a display device and a viewing system, such as a viewer.

In some embodiments, at least one update cycles—optionally, a plurality of update cycles—is completed within the integration time of the human eye. In some arrangements, an update cycle is initiated if a change to the viewing position of the viewer is detected.

There is further provided a light engine (or display system or image projector) arranged to form an image visible from a viewing window. In embodiments, the light engine comprises a display device, an optical replicator and a light shuttering device as disclosed herein. In embodiments, the display device is arranged to display a hologram of the image and spatially modulate light in accordance with the hologram. The optical replicator comprises a waveguide pupil expander arranged to receive the spatially modulated light and provide a plurality of different light propagation paths for the spatially modulated light from the display device to the viewing window. The light shuttering device is disposed between the waveguide and the viewing window. In some embodiments, the hologram is configured to angularly distribute spatially modulated light of the image in accordance with position of image content, such that angular channels of the spatially modulated light correspond with respective continuous regions of the image.

In some embodiments, at least one liquid crystal cell of the plurality of liquid crystal cells of the light shuttering device forms an aperture arranged such that a first viewing position within the viewing window receives spatially modulated light having an associated first light propagation path through the optical replicator and a second viewing position within the viewing window receives spatially modulated light having an associated second light propagation path through the optical replicator. The first light propagation path is different to the second light propagation path. In some embodiments, the spatially modulated light associated with the first light propagation path is a first channel of spatially modulated light and the spatially modulated light associated with the second light propagation path is a second channel of spatially modulated light. In particular, at least one liquid crystal cell of the plurality of liquid crystal cells of the light shuttering device may form an aperture arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image.

In some embodiments, the first region and second region are adjacent regions of the image. In some embodiments, adjacent angular channels of the spatially modulated light correspond to adjacent regions of the image. In some embodiments, the first region and second region of the image are substantially non-overlapping.

In some embodiments, the image is a virtual image perceived upstream of the display device. In some embodiments, the light shuttering device is coupled to an output face of the waveguide pupil expander. In some embodiments, the light shuttering device restricts the area of the output face of the waveguide that is visible from the viewing window. In some embodiments, the waveguide pupil expander and viewing window are non-parallel.

In some embodiments, the control device comprises at least one opening—such as a plurality of openings. Each opening may provide the first viewing position and/or the second viewing position with a respective light propagation path of spatially modulated light, such that spatially modulated light having propagated through different light propagation paths is delivered, respectively, to the first and second viewing positions at substantially the same time. When the hologram is a channeling hologram, configured to angularly distribute spatially modulated light of image in accordance with position of the image content, the control device may comprise at least one opening—such as a plurality of openings—wherein each opening provides the first viewing position and/or the second viewing position with a respective channel of spatially modulated light, such that different image content is delivered, respectively, to the first and second viewing positions at substantially the same time. In some embodiments, the respective channels are non-overlapping but continuous.

In some embodiments, the control device is configured such that each opening is switchable between an open position and a closed position such that a plurality of different control device configurations is provided in which each control device configuration comprises an alternating sequence of open and closed openings. The control device may be configured to provide a first control device configuration at a first time and a second control device configuration at a second time, wherein the first control device configuration and second control device configuration are complementary. Advantageously, the time interval between the first time and second time is less than the integration time of the human eye.

In some embodiments, a first control device configuration provided by the control device delivers light modulated in accordance with first and third image zones of the image to the first viewing position and light modulated in accordance with second and fourth image zones of the image of the image to the second viewing position, wherein the first to fourth zones are ordered, contiguous areas of the image. In some embodiments, a second control device configuration provided by the control device delivers light modulated in accordance with second and fourth image zones of the image to the first viewing position and light modulated in accordance with the first and third of the image to the second viewing position. In some embodiments, the image content of any one of the first to fourth image zones as delivered to the first viewing position is non-identical to the image content of a corresponding one of the first to fourth image zones as delivered to the second viewing position.

In some embodiments, the first viewing position and second viewing position are first and second eye positions of a viewer, and the viewing window is an eye-box.

In some embodiments, a size and/or a location, within the control device, of at least one of the openings is dynamically variable.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction may be a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object (i.e. target image for reconstruction). Such a holographic recording may be referred to as a phase-only hologram. Embodiments relate to a phase-only hologram but the present disclosure is equally applicable to amplitude-only holography. The present disclosure is not limited to any particular method of hologram calculation. Some embodiments relate to point cloud holograms—that is, holograms built up using point cloud methods—by way of example only. However, the present disclosure is equally applicable to Fourier or Fresnel-type holograms and holograms calculated according to other techniques such as coherent ray tracing.

The present disclosure is also equally applicable to forming a holographic reconstruction using amplitude and phase information related to the original object (i.e. target image). In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
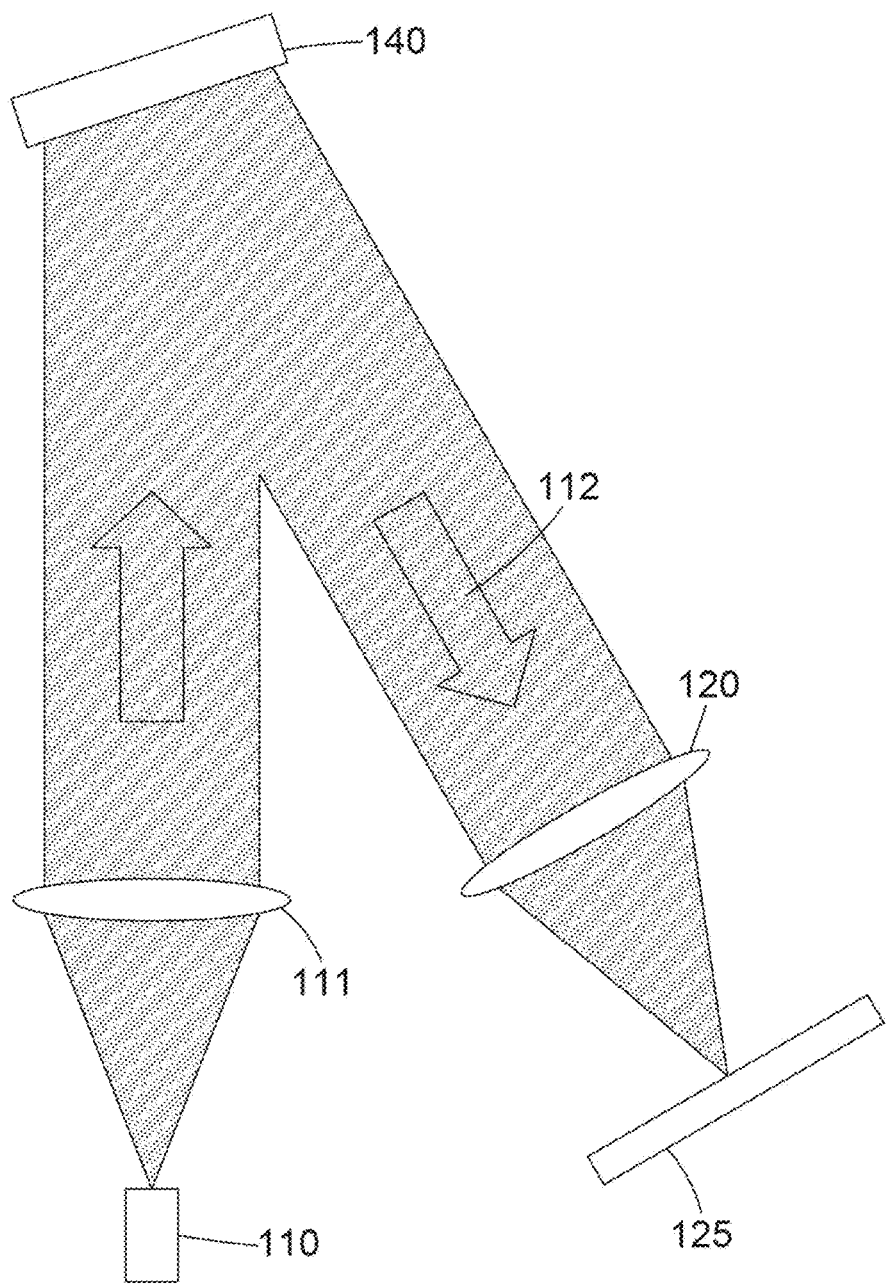
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It will be appreciated that this is merely an example, and that other methods for computer-generating the hologram are contemplated in the present disclosure. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image.

The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
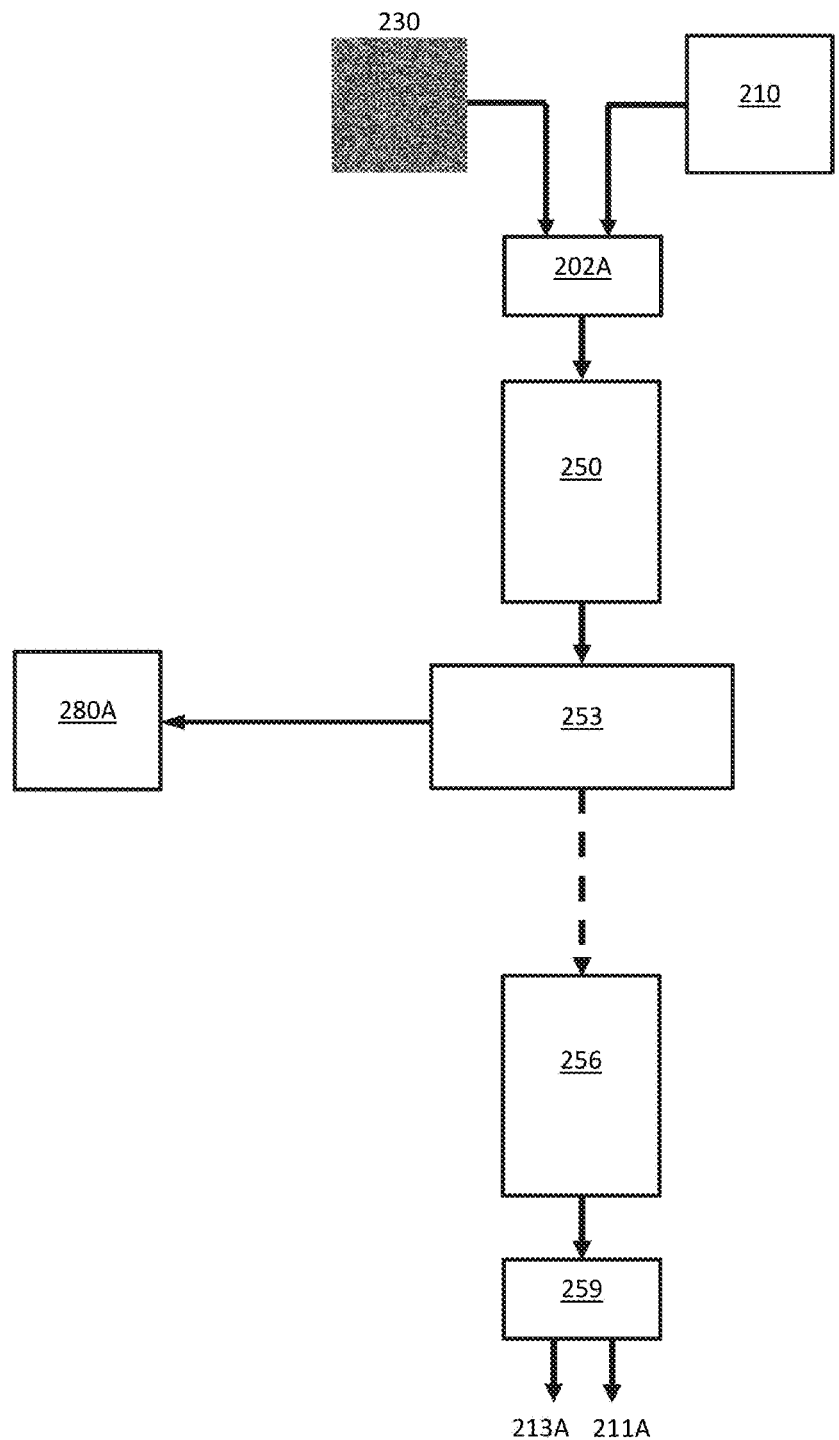
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
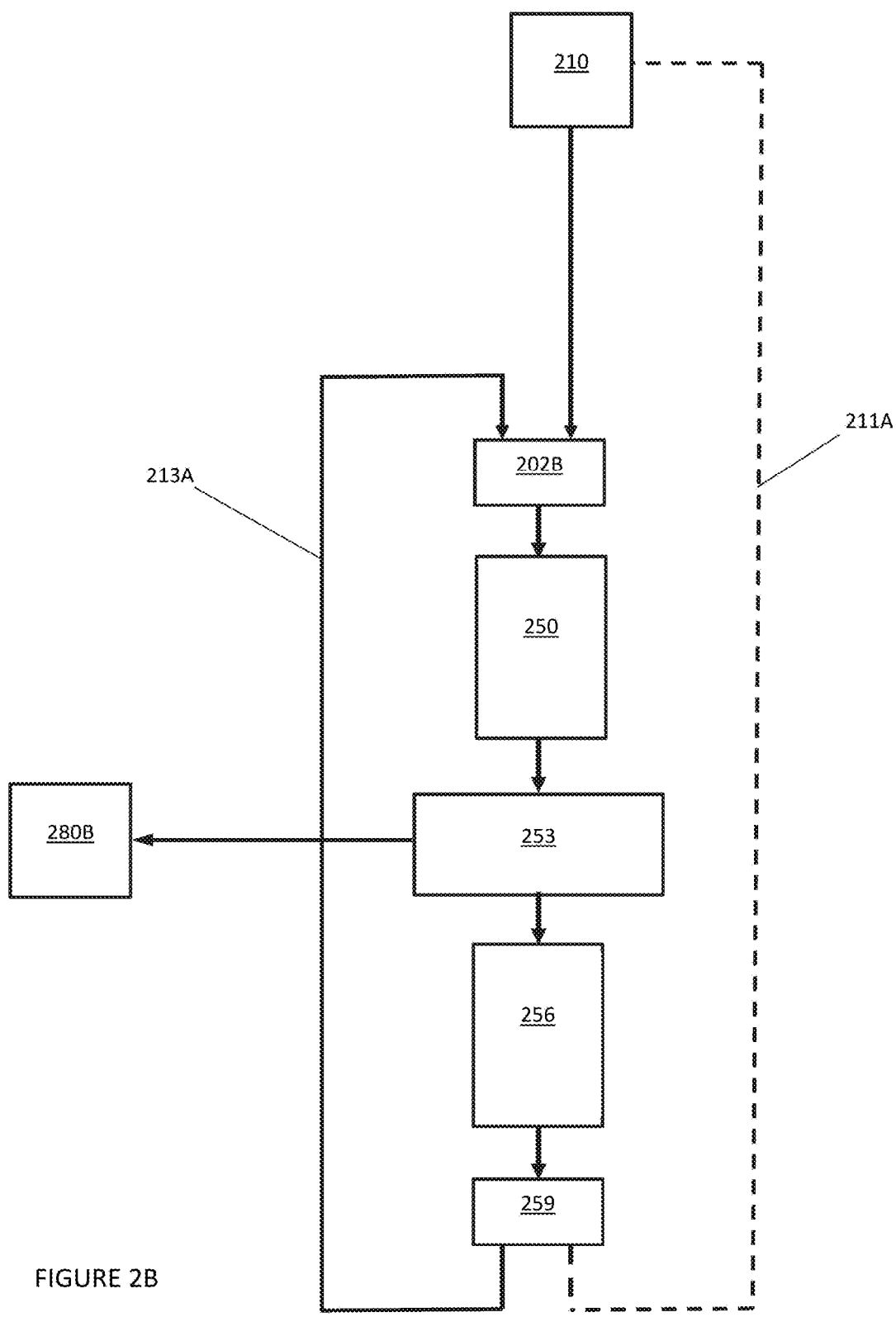
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
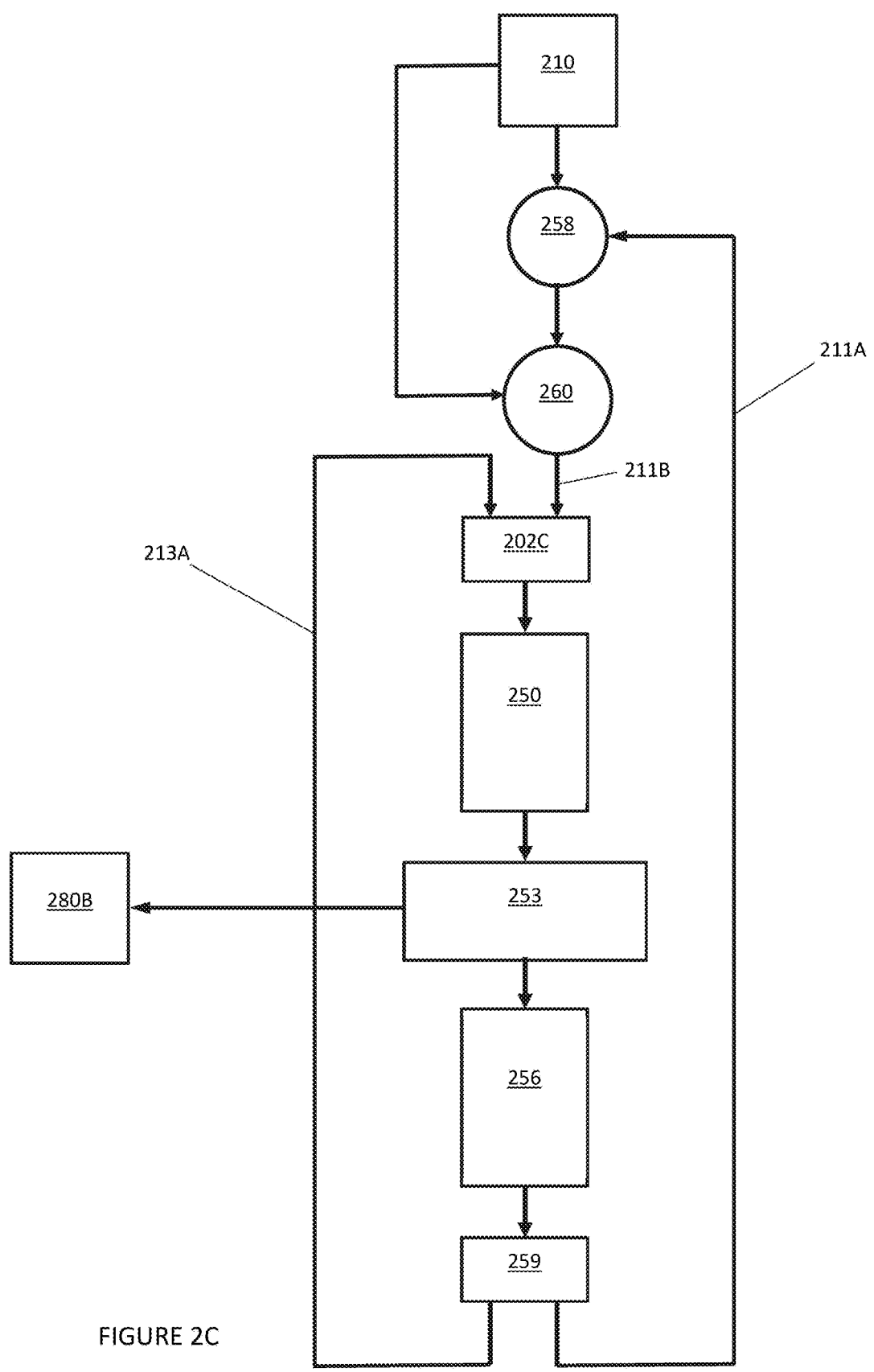
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor $\alpha$ and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
$\angle$ is the phase component;
$\psi$ is the phase-only hologram 280B;
$\eta$ is the new distribution of magnitude values 211B; and
$\alpha$ is the gain factor.

The gain factor $\alpha$ may be fixed or variable. In some embodiments, the gain factor ⍺ is determined based on the size and rate of the incoming target image data. In some embodiments, the gain factor $\alpha$ is dependent on the iteration number. In some embodiments, the gain factor $\alpha$ is solely function of the iteration number.

The embodiment of FIG. 2C is the same as that of FIG. 2A and FIG. 2B in all other respects. It may be said that the phase-only hologram $\psi(u, v)$ comprises a phase distribution in the frequency or Fourier domain.

In some embodiments, the Fourier transform is performed using the spatial light modulator. Specifically, the hologram data is combined with second data providing optical power.

That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods. As will be seen, subsequent Figures herein are described as comprising a point cloud method for hologram calculation. However other methods of hologram calculation, including the Fourier method described above in relation to FIGS. 2A to 2C, may instead be used.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
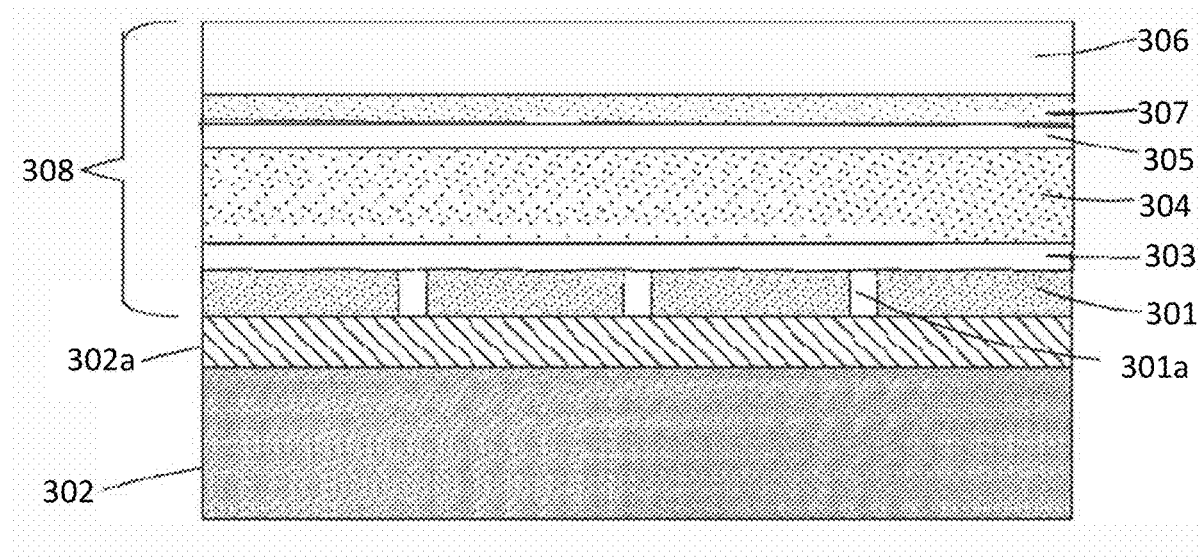
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Projection Using a Small Display Device and a Long Viewing Distance

The present disclosure relates to image projection wherein the separation between the display device and viewer is much greater than the size of the display device. The viewing distance (i.e. distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device.

In accordance with the present disclosure, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The display device comprises pixels that display the hologram. The pixel structure of the display device is diffractive. The size of the holographic image is therefore governed by the rules of diffraction. A consequence of the diffractive nature of the display device is explained below with reference to FIG. 4.

Figure 4:
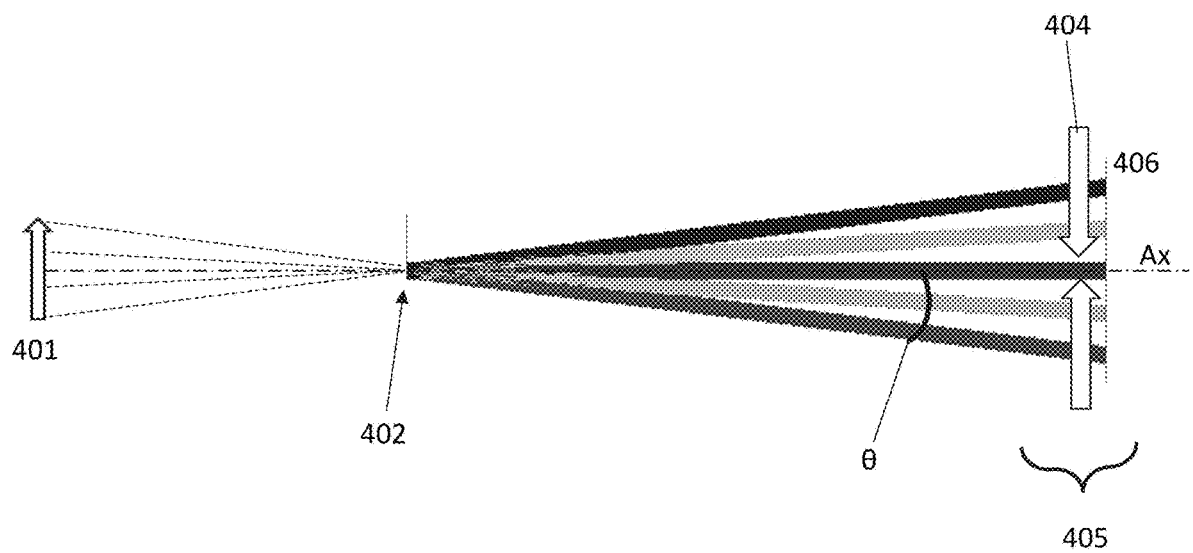
FIG. 4 shows angular content of a virtual image effectively propagating from a display device towards an aperture.

FIG. 4 shows a pixelated display device 402 arranged to display a hologram forming a virtual image 401 upstream of the display device 402. The diffraction angle, q, of the display device determines the size of the virtual image 401. The virtual image 401, display device 402 and viewing system 405 are arranged on an optical axis, Ax.

The viewing system 405 has an entrance aperture 404 and viewing plane 406. The viewing system 405 may be a human eye. The entrance aperture 404 may therefore be the pupil of the eye and the viewing plane 406 may be the retina of the eye.

The light travelling between the display device 402 and viewing system 405 is modulated with a hologram of the image (not the image itself). However, FIG. 4 illustrates how the hologram divides the virtual image content by angle. Each illustrated light ray bundle relates to a different part of the virtual image 401. More specifically, the light in each light ray bundle is encoded by the hologram with information about one part of the virtual image. FIG. 4 shows five example ray bundles each characterized by a respective angle to the optical axis, Ax, and each representing a respective part of the virtual image. In this example, one of the light bundles passes through the pupil 404 and the other four light bundles are blocked by the pupil 404. Again, the five different ray bundles correspond to five different parts of the virtual image 401. The full image content of the virtual image is effectively divided by angle. The light bundle travelling along the optical axis, Ax, carries the centre part of the image information—that is, the information relating to the centre of the image. The other light bundles carry the other parts of the image information. The two light bundles shown at the extremes of the light cone carry the edge parts of the image information. A consequence of this division of the image information by angle is that not all image content can pass through the entrance aperture 404 of the viewing system at a given viewing position. In other words, not all image content is received by the eye. In the example of FIG. 4, only one of the five light bundles illustrated passes through the pupil 404 at any viewing position. The reader will understand that five light bundles are shown by way of example only and the process described is not limited to division of the image information of the virtual image into only five light bundles.

In this example, the centre part of the image information is received by the eye. The edge part of the image information is blocked by the pupil of the eye. The reader will understand that if the viewer moves up or down, a different light bundle may be received by the eye and, for example, the centre part of the image information may be blocked. The viewer therefore only sees a portion of the full image. The rest of the image information is blocked by the entrance pupil. The view of the viewer is heavily restricted because they are effectively looking at the image through the small aperture of the display device itself.

In summary, light propagates over the range of diffraction angle from the display device. At a 1 m viewing distance, only a small range of angles from the display device can propagate through the eye's pupil to form image at the retina for a given eye position. The only parts of the virtual image that are visible are the ones falling within the small angular range shown in FIG. 4 that passes through the entrance aperture. Accordingly, the field of view is very small, and the specific angular range depends heavily on the eye position.

The problem of the small field of view and sensitivity to eye position explained with reference to FIG. 4 is a consequence of the large viewing distance and small aperture of the display device. The importance of viewing distance is explained further with reference to FIGS. 5 to 7.

Figure 5A:
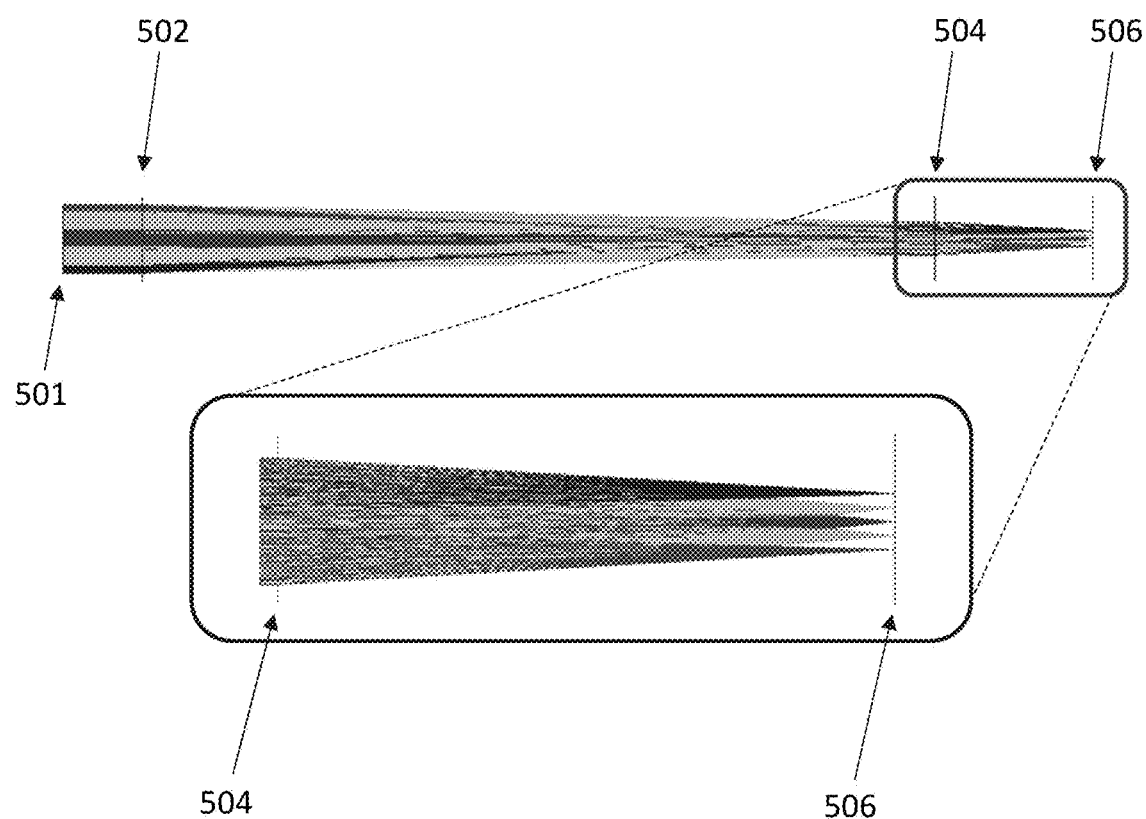
FIG. 5A shows a viewing system with a relatively small propagation distance.

FIG. 5A shows a display device 502 arranged to display a hologram and propagate light modulated in accordance with the hologram to a viewing system comprising an entrance aperture 504 and viewing plane 506. The virtual image 501 is at infinity and so the rays traced between the virtual image and display device are collimated. The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

FIG. 5A only shows those rays of light that can propagate through the aperture 504; any other rays, which cannot pass through the aperture 504, are omitted. However, it will be understood that those other rays would also propagate from the display device 502, in practice. In FIG. 5A, the distance between the display device and viewing plane is small enough that the full diffraction angle from the display device can form the image on the retina. All light propagation paths shown from the virtual image pass through the entrance aperture. Accordingly, all points on the virtual image map onto the retina and all image content is delivered to the viewing plane. The field of view of the perceived image is therefore a maximum. At the optimum position, the field of view is equal to the diffraction angle of the display device. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
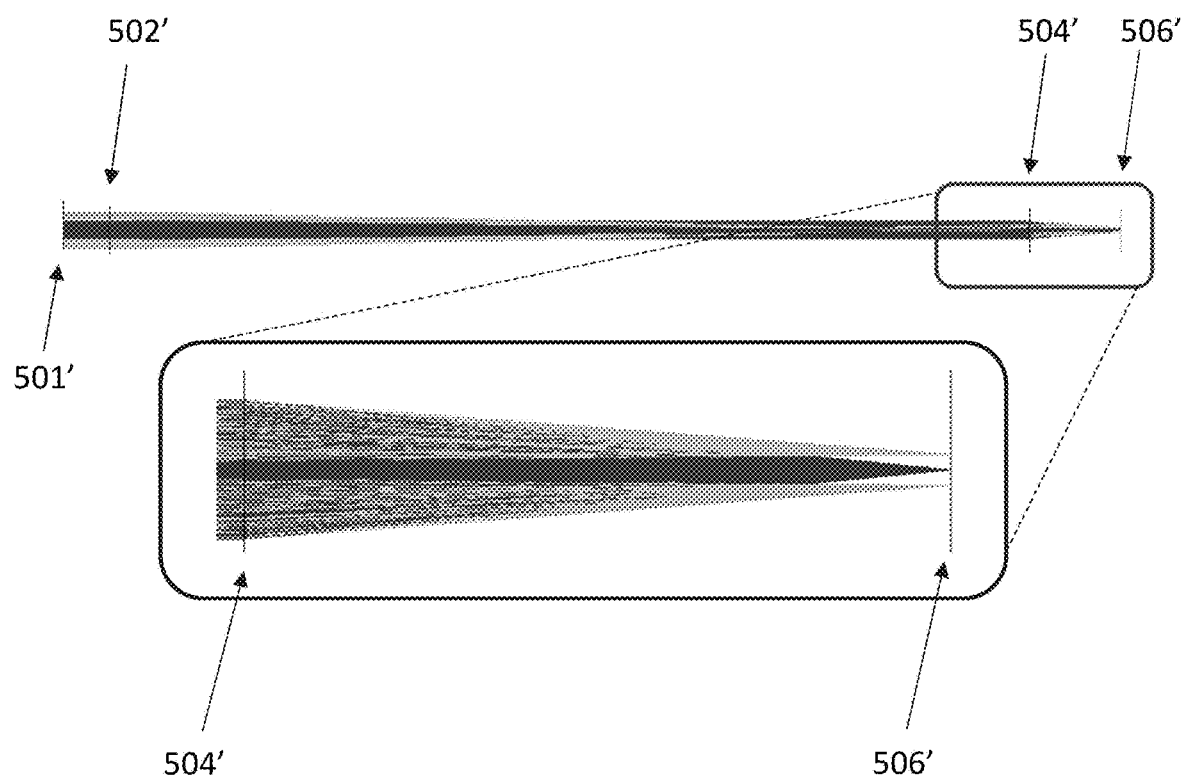
FIG. 5B shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image 501' and display device 502' are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'. At the larger viewing distance of FIG. 5B, some of the ray bundles are blocked by the entrance aperture 504'. Specifically, ray bundles associated with edge parts of the virtual image are blocked by the entrance pupil 504'. Accordingly, the entire virtual image is not visible and the part of the virtual image that is visible is heavily dependent on eye position. Thus, large distances between the display device and viewing system are problematic owing to the small size of the display device.

Figure 6A:
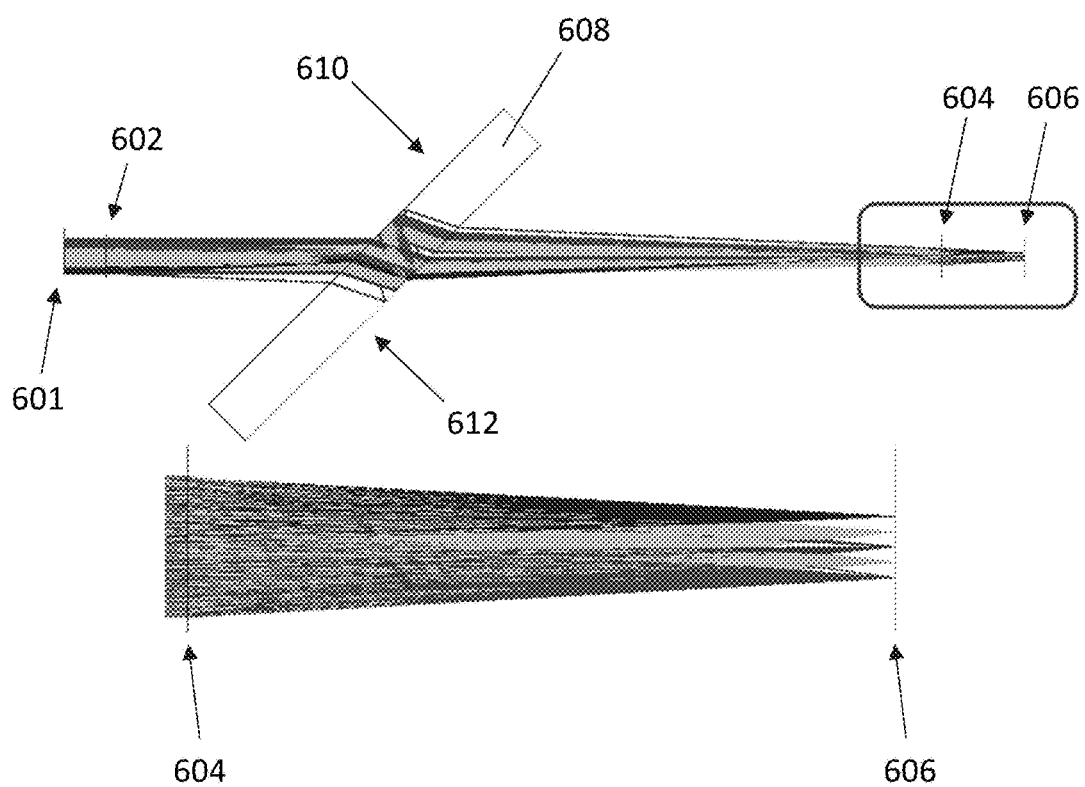
FIG. 6A shows a viewing system with a relatively large propagation distance, which includes a waveguide, for forming a virtual image at infinity.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 606. This figure is schematic and therefore physiological detail of the eye is not shown.

The viewing distance of FIG. 6A is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612. Therefore, some of the light may simply be refracted between the two planar surfaces 610, 612 of the waveguide 608 before being transmitted, whilst other light may be reflected, and thus may undergo one or more reflections, (or 'bounces') between the planar surfaces 610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilised and the viewing window is maximised for the user. In turn, this means that all the light rays contribute to the perceived virtual image 601.

Figure 6B:
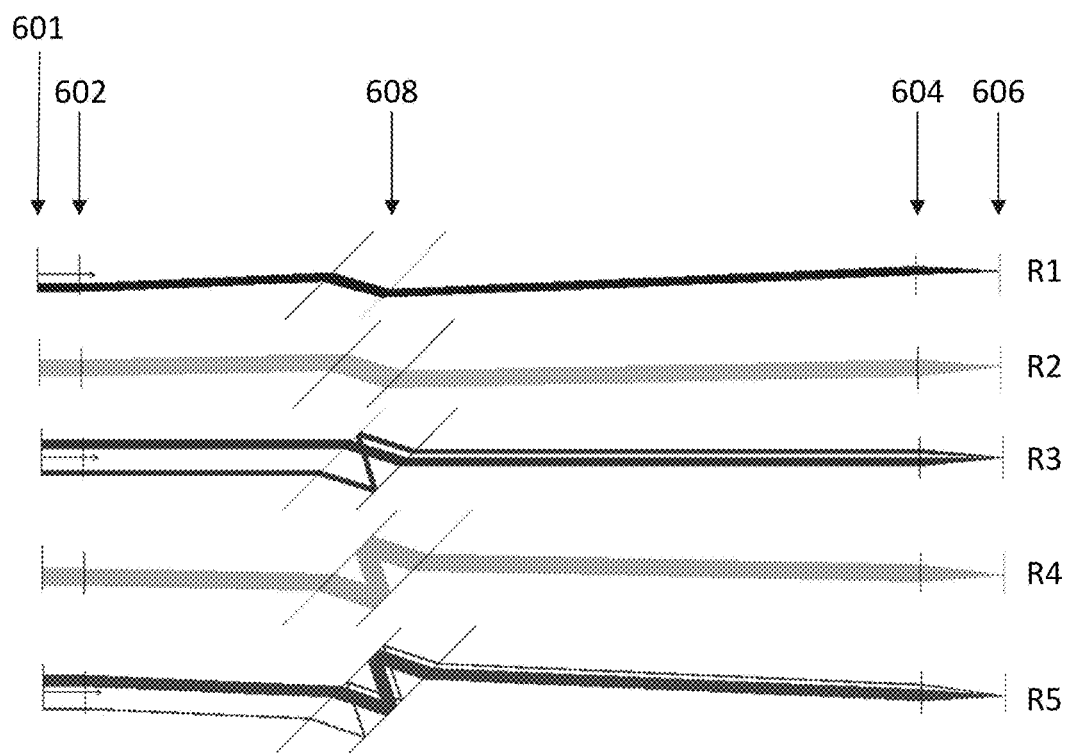
FIG. 6B shows a magnified view of the optical paths of FIG. 6A.

FIG. 6B shows the individual optical paths for each of the five ray bundles that contribute to five respective image points within the virtual image 601 that is formed in FIG. 6A—labelled from top to bottom as R1 to R5, respectively. As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

The inventors have recognised that light from different parts of the virtual image 601 (i.e. different virtual image points) follows different optical paths through the system. In an embodiment illustrated by FIGS. 7A and 7B, the inventors configured the system such that, in simple terms, (i) the virtual image comprises a plurality of discrete virtual image components or areas and (ii) light of each virtual image component is associated with a different number of bounces/reflections within the waveguide 708.

Figure 7A:
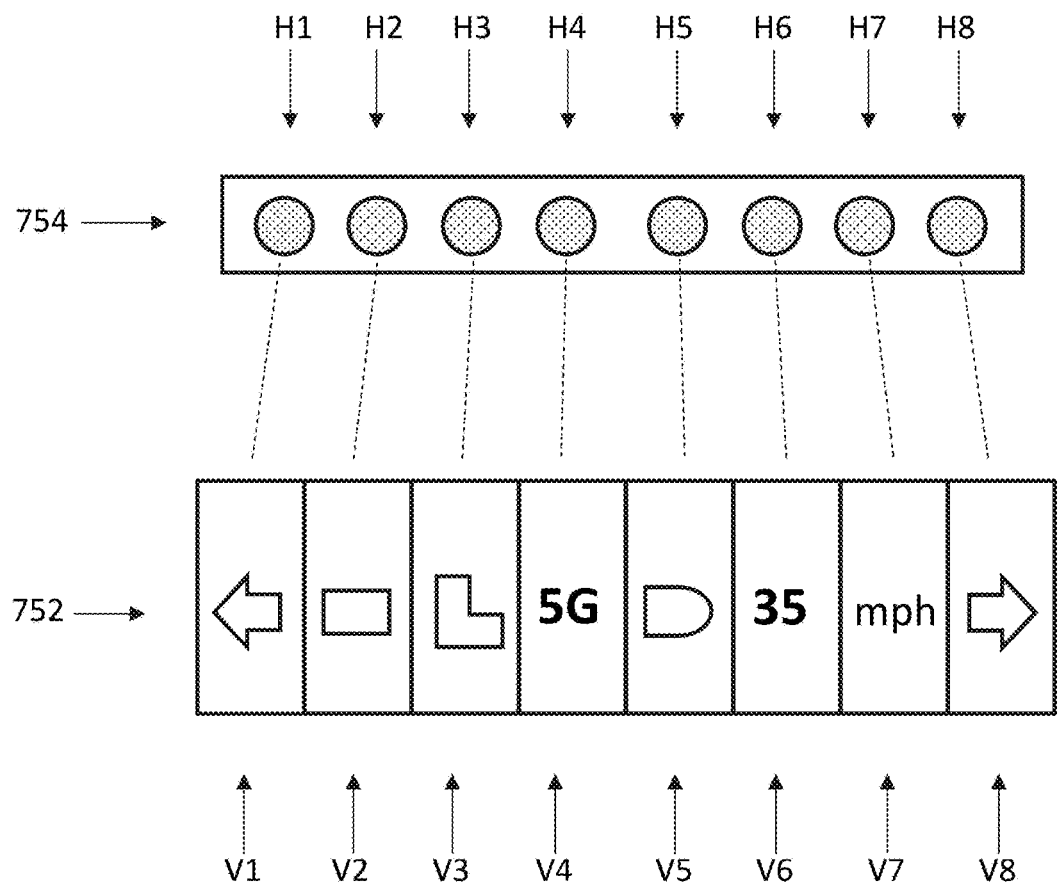
FIG. 7A shows an image comprising a plurality of image areas (bottom) and corresponding hologram comprising a plurality of hologram components (top)
Figure 7B:
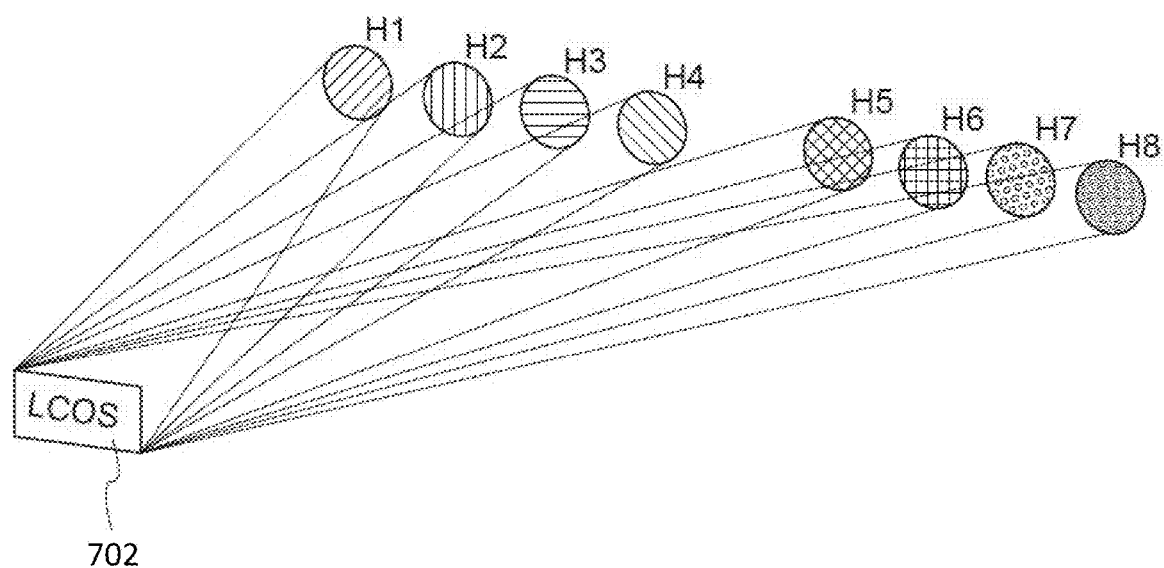
FIG. 7B shows a hologram, in accordance with the present disclosure, characterised by the routing or channeling of holographically encoded light into a plurality of discrete hologram channels.

FIG. 7A shows an image 752 for projection comprising eight image areas/components, V1 to V8. FIG. 7A shows eight image components by way of example only and the image 752 may be divided into any number of components. FIG. 7A also shows the encoded light pattern 754 that can reconstruct the image 752—e.g. when transformed by the lens of a suitable viewing system. The encoded light pattern 754 comprises first to eighth sub-holograms or components, H1 to H8, corresponding to the first to eighth image components/areas, V1 to V8. FIG. 7A further shows how a hologram calculated in accordance with this disclosure effectively decomposes the image content by angle. The hologram may therefore be characterised by the channeling of light that it performs. This is illustrated in FIG. 7B. Specifically, the hologram in accordance with this disclosure directs light into a plurality of discrete areas. The discrete areas are discs in the example shown but other shapes are envisaged. The size and shape of the optimum disc may, after propagation through the waveguide, be related to the size and shape of the entrance pupil of the viewing system. This channeling of light only occurs due to the specific method of determining the hologram disclosed herein.

Figure 7C:
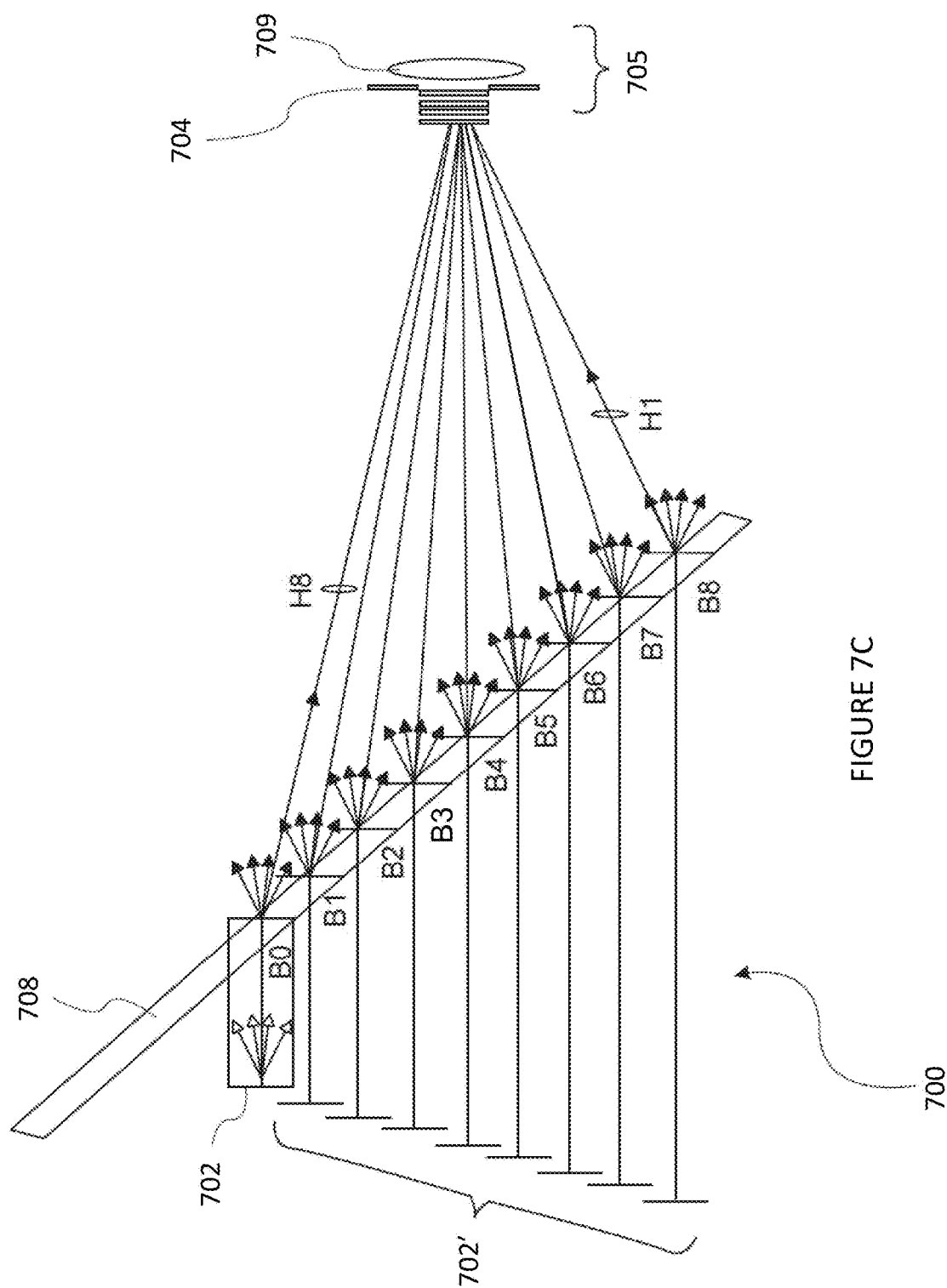
FIG. 7C shows an optimised system arranged to route the light content of each hologram channel through a different optical path to the eye.
Figure 13:
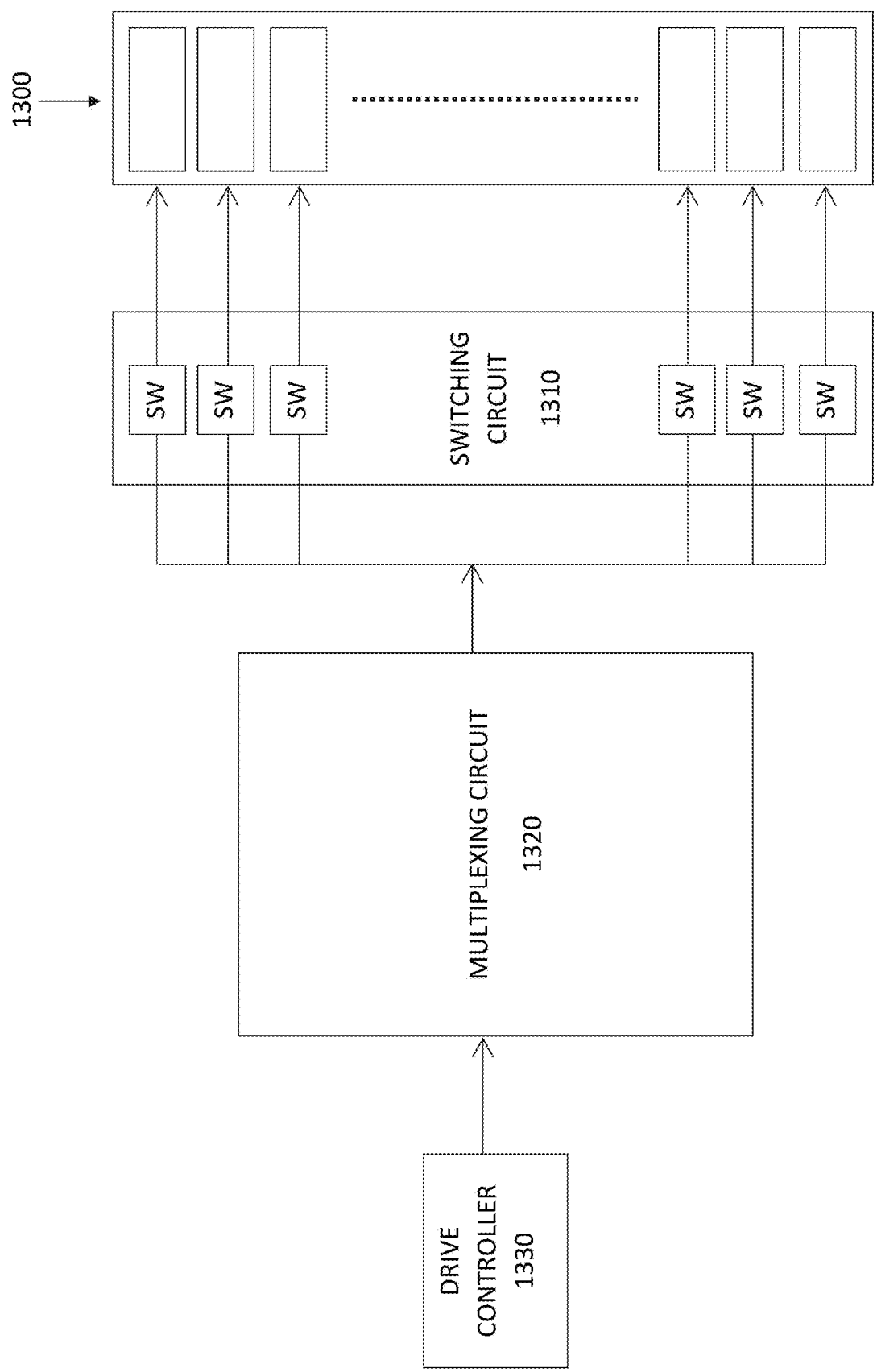
FIG. 13 shows a block diagram of a system for driving the light shuttering device of FIG. 12, in accordance with embodiments.

FIG. 7C shows an improved viewing system 700, in accordance with the recognitions illustrated in FIGS. 7A and 15B. GB2108456.1 describes methods for deriving a data structure (as shown in FIGS. 13 and 14 thereof), which may be applied to the scheme illustrated by FIGS. 7A and 7B.

The viewing system 700 comprises a display device, which in this arrangement comprises an LCOS 702. The LCOS 702 is arranged to display a modulation pattern (or "diffractive pattern") comprising the hologram and to project light that has been holographically encoded towards an eye 705 that comprises a pupil that acts as an aperture 704, a lens 709, and a retina (not shown) that acts as a viewing plane. There is a light source (not shown) arranged to illuminate the LCOS 702. The lens 709 of the eye 705 performs a hologram to image transformation.

The viewing system 700 further comprises a waveguide 708 positioned between the LCOS 702 and the eye 705. The projection distance in FIG. 7C may be relatively large. However, as described in relation to previous Figures, the presence of the waveguide 708 enables all angular content from the LCOS 702 to be received by the eye 705, even at this relatively large projection distance. This is because the waveguide 708 acts as a pupil expander, in a manner that has been described hereabove.

Additionally, in this arrangement, when the LCOS 702 has been encoded in accordance with the methods described herein, the waveguide 708 can be oriented at an angle with respect to the LCOS 702 in order to establish a unique relationship between the light from the LCOS 702 and the virtual image that the viewer will perceive. The size, location, and position of the waveguide 708 are configured to ensure that light from each part of the virtual image enters the waveguide 708 and is guided along its elongate axis, bouncing between the substantially planar surfaces of the waveguide 708. Each time the light reaches the second planar surface (nearest the eye 705), some light is transmitted and some light is reflected.

FIG. 7C shows a total of nine "bounce" points, B0 to B8, along the length of the waveguide 702. The reader will notice that the centre of the image 752 is kept blank. FIG. 7C shows zeroth to ninth light "bounce" or reflection points, B0 to B8, within the waveguide. It will be understood that the reflections points, B0 to B8, are also transmissions points.

Although light relating to all points of the image (V1-V8) is transmitted out of the waveguide at each "bounce" from the second planar surface of the waveguide 708, only the light from one of angular part of the image (e.g. light of one of V1 to V8) has a trajectory that enables it to reach the eye 705, from each respective "bounce" point, B0 to B8. Moreover, light from a different angular part of the image, V1 to V8, reaches the eye 705 from each respective "bounce" point. FIG. 7C shows light from all the different angular content being emitted at each "bounce" point, (depicted by a plurality of short arrows at each transmission point), but then only shows the optical path, to the eye 705, of the respective angular content that will actually reach the eye 705—and therefore will contribute to a respective portion of the virtual image that the viewer will perceive—from that respective part of the waveguide. For example, for the zeroth bounce, B0, the light that is transmitted by the waveguide 708 is simply refracted and does not undergo any reflections therein. Light of the eighth sub-hologram, H8, reaches the eye from the zeroth bounce, B0. For the next bounce B1, the light that is transmitted by the waveguide 702 undergoes one bounce therein, before transmission. Light from the seventh hologram, H7, reaches the eye from the next bounce, B1 This continues in sequence until the light that is transmitted by the waveguide 708 at the final bounce, B8, has undergone eight bounces, before being transmitted and reaching the eye 705, and comprises light encoded in accordance with the first hologram, H1.

In the example shown in FIGS. 7A-C, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, the recognitions made by the inventors, and the methods and arrangements described herein and in co-pending GB2108456.1, can enable a diffractive pattern (or, "light modulation pattern") comprising a hologram to be generated that, when displayed on an LCOS or other suitable display device, can enable the light to be emitted therefrom effectively in a plurality of 'discs', or ray bundles of light, each of which corresponds to (more specifically, encodes) a different respective part of the corresponding virtual image.

Thus, improved methods and arrangements are described herein that enable holograms to be calculated, and to be displayed on a suitable display device, in a manner that enables images to be seen, by a viewer, when the display device is illuminated by a suitable light source. Using methods described in GB2108456.1, the images that the viewer sees can be free of ghosts and may be made brighter by the contribution of light, which would conventionally have contributed to a ghost image, instead contributing to the single main image.

The improved methods and arrangements described herein can be implemented in a variety of different applications and viewing systems. For example, they may be implemented in a head-up-display (HUD). In an improvement over many conventional HUDs, in which virtual images are formed, the improved methods and arrangements described herein can be implemented for creating virtual images at finite image distances—which can be selected and tuned by a suitable controller—whilst still eliminating ghost images.

Although virtual images, which require the eye to transform received modulated light in order to form a perceived image, have been discussed herein, the improved methods and arrangements described herein can be applied to real images.

Waveguide Aperture

Although the Figures above have shown a single eye or a single "opening" or "entrance pupil", all the arrangements and methods described herein are applicable to a viewing system with multiple entrance pupils—for example, and most commonly, to a binocular viewing system such as a human viewer having two eyes.

The inventors have recognised that, when a hologram of a target image is calculated as described above, which includes constraining the hologram in accordance with an entrance pupil of the viewing system, consideration should be given to the possible effects when the viewing system has multiple entrance pupils—for example, when the viewer is viewing the holographically reconstructed image with both eyes. In embodiments, the hologram may be constrained in accordance with one entrance pupil of the multiple entrance pupils, but some or all of the image may also be visible to one or more other entrance pupils, of the multiple entrance pupils. In embodiments, the hologram may be constrained in accordance with two or more entrance pupils, of the multiple entrance pupils. For example, two sub-holograms, each of which is constrained in accordance with a different respective entrance pupil, may be calculated and combined (e.g., summed) into a single hologram for display on a display device. For example, a left eye hologram and right eye hologram may be calculated from a respective left eye image and right eye image, wherein the left eye hologram is constrained during calculation in accordance with the entrance pupil of the left eye of the viewer and the right eye hologram is constrained during calculation in accordance with the entrance pupil of the right eye of the viewer. In embodiments, two or more holograms, each constrained in accordance with a different respective entrance pupil of the multiple entrance pupils, may be interlaced with one another. In other words, the two holograms may be displayed alternately, in quick succession, so that the viewer perceives the two corresponding images as being formed substantially simultaneously.

The inventors have recognised that additional guidance or control may be applied to the light propagating from the displayed hologram towards a viewing system, in order to make it more suitable for receipt by multiple entrance pupils of that viewing system.

As described in detail hereabove, when a hologram is calculated in accordance with the described methods and displayed and propagated with a system such as that shown in FIG. 7C, at each transmission point—or "bounce point" such as B0 to B8 as shown in FIG. 7C—light relating to all points of the image (V1-V8) is transmitted out of the waveguide. The middle region of the image 752 in FIG. 7A is blank and so a hologram channel associated with the middle of the image is not shown or labelled in FIG. 7B. Accordingly, in FIG. 7C, the optical path associated with transmission point B4 may not deliver any image content to the viewing system. However, for a single-entrance pupil viewing system, only the light from one angular part of the image (e.g., light of a respective one of each of V1 to V8) has a trajectory that enables it to reach the eye 705, from each respective "bounce" point, B0 to B8. Moreover, light from a different angular part of the image, V1 to V8, reaches the eye 705 from each respective "bounce" point. Therefore, in FIG. 7C, a single entrance pupil 704 is shown as receiving all of the angular content of an image, but with each angular part of the image coming from a different respective bounce point on the waveguide 708. However, the present inventors have recognised that, if a viewing system has two or more entrance pupils, there is a risk that light from the same angular part of the image will reach both entrance pupils simultaneously, since all angular parts of the image are emitted at each bounce point on the waveguide. For example, when the viewing system is a human and the multiple entrance pupils comprise both eyes, the right eye may receive light comprising particular angular content $V_x$ via a light path that is emitted from the waveguide after a first number of bounces $B_y$, and the left eye may receive the same angular content $V_x$ simultaneously (or, substantially simultaneously, given the speed of light) via a light path that is emitted from the waveguide after a second, different number of bounces $B_z$. This may lead to confusion since the human brain—and, indeed, a processor associated with any non-human viewing system—does not expect to receive the same part of an image (i.e., the same image content), at the same angle, simultaneously at two entrance pupils that are spatially separated from one another. Instead, the brain (or other processor) would expect the light from a single point, or single part of an image, to be received by the two (or more) entrance pupils at different respective angles.

Figure 8:
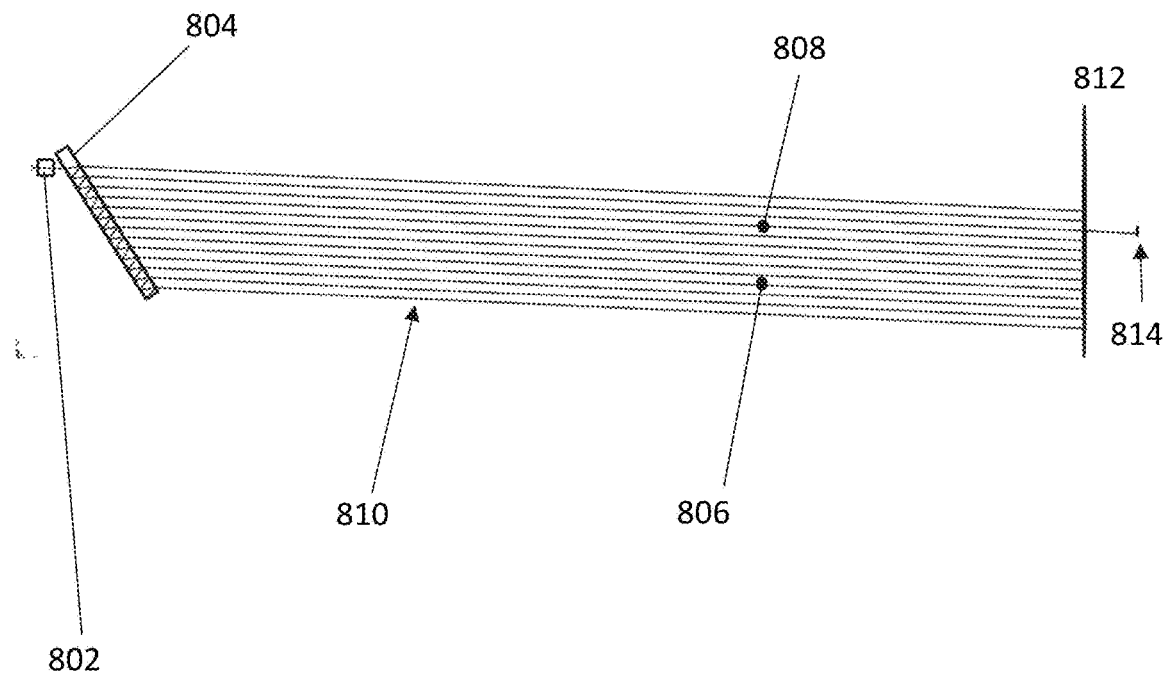
FIG. 8 shows a system including a waveguide outputting multiple instances of an angular light channel.

FIG. 8 illustrates the above-described problem, which the present inventors have addressed. FIG. 8 shows a display device 802 that displays a hologram that has been calculated in accordance with the methods described in GB2108456.1.

The display device 802 is illuminated by a light source (not shown). The light is spatially modulated by the displayed hologram and propagated towards a waveguide 804. As described in detail in relation to previous figures, the light is refracted within the waveguide 804. After refraction, some of the light is emitted towards the viewer at a first transmission point (or "bounce point") and other portions of the light are reflected (or "bounced") internally within the waveguide 804 before transmission, with respective portions of the light being emitted towards the viewer at different respective transmission points (or "bounce points") along the length of the waveguide 804.

FIG. 8 only shows the optical paths 810 for the light of one part ($V_x$) of an image that is represented by the displayed hologram. The lights of the other parts of the image would, in practice, also be transmitted from the waveguide towards the viewer, but they have been omitted from FIG. 8 for ease of understanding. It will be appreciated that the lights of the other angular parts of the image would follow different respective optical paths, between the bounce points on the waveguide 804 and the viewer, and that light of each (i.e., every) angular part of the image would be emitted at each (i.e., every) bounce point on the waveguide, towards the viewer.

FIG. 8 shows an entrance pupil plane 812, indicating a plane at which the pupils of the viewer's eyes are located, and an image display plane 814, indicating a plane at which an image is formed, on the retinas of the viewer's eyes. FIG. 8 also shows a first marker 808 that indicates which one of the optical paths 810 is travelling towards, and will enter through the entrance pupil of, the viewer's right eye, and a second marker 806 that indicates which one of the optical paths 810 is travelling towards, and will enter through the entrance pupil of, the viewer's left eye. As can be seen, each eye will only receive the light of one optical path of the multiple optical paths 810, and each eye will receive the light via a different optical path 810 to the respective other, because the viewer's eyes are naturally spatially separated from one another. However, as described above, all of the optical paths shown in FIG. 8 comprise light of the same (i.e., of a common) part of the image. Therefore, both eyes will receive the same image content at the same incident angle, albeit via different respective optical paths. The present inventors have recognised that this may lead to confusion and may impair the clarity of the image that the viewer perceives. The present inventors have addressed this potential problem, as will be understood from the description below. Moreover, although only the optical paths of the light of one angular part of the image are shown in FIG. 8, it is possible that the light of one or more other angular parts of the image may also be received simultaneously by both the viewer's left and right eyes, in a similar fashion.

Figure 9:
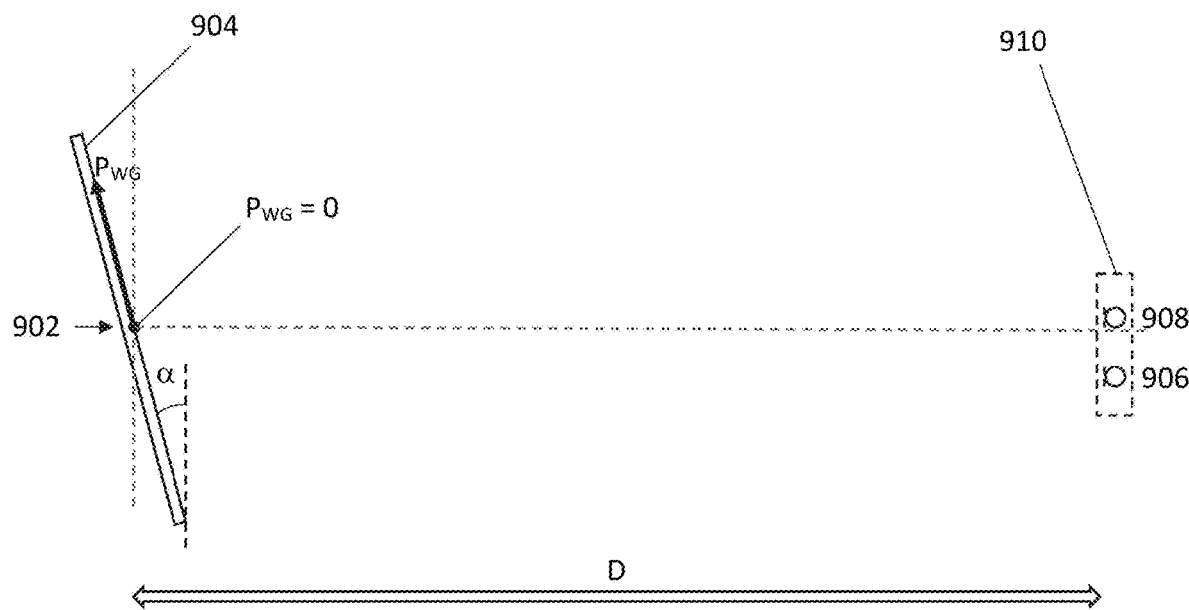
FIG. 9 shows a waveguide and a viewing system.
Figure 9:
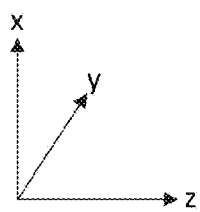

FIG. 9 shows a display system, or light engine, that includes a waveguide 904 and a viewing system 910 comprising two entrance pupils. In this example, the viewing system 910 is a human viewer and the two entrance pupils are part of the viewer's left eye 906 and right eye 908, respectively, however this should be regarded as non-limiting and the present disclosure also applies to other types of viewing system. Other parts of the display system have been omitted from FIG. 9. The waveguide 904 has a (substantially) central point 902, defined on its large face that is nearer the viewing system 910, wherein it is defined that the "position along the waveguide" ($P_{WG}$) is equal to zero ($P_{WG}=0$) at that central point 902. An optical axis is represented by a substantially horizontal dashed line, extending (in the "z" direction, in this example) from the central point 902 to the viewing system 910. An "x" axis is defined by a substantially vertical line, extending from the central point 902, substantially perpendicular to the optical axis. The waveguide 904 is arranged at an angle "α" to the x axis. An entrance pupil plane on which the pupils of the viewer's eyes are located, spatially separated from one another on the entrance pupil plane, is substantially parallel to the x axis, in this example. However, the present disclosure is not limited to the arrangement of FIG. 9, nor to the relative positions of any of the features therein. For example, in practice a viewer's eyes may not be precisely located on a common entrance pupil plane that is perpendicular to an optical axis extending towards the viewer from the waveguide. The locations of the viewer's eyes, at a given time, may be calculated or otherwise obtained by a processor that is comprised within, or in communication with, the display system. For example, any suitable eye tracking method may be employed.

The "position along the waveguide" ($P_{WG}$) of other points on that face of the waveguide 904 may be defined according to their position relative to the central point 902. By way of non-limiting example, any points located to the right of the central point 902, as seen by the viewer 910 in FIG. 9, may be assigned a positive (+) value of $P_{WG}$, with the magnitude of the $P_{WG}$ being defined by the distance, along the face of the waveguide, between the central point 902 and the other point. Conversely, any points located to the left of the central point 902, as seen by the viewer 910 in FIG. 9, may be assigned a negative (−) value of $P_{WG}$, with the magnitude of the $P_{WG}$ again being defined by the distance, along the face of the waveguide, between the central point 902 and the other point. A distance "D" is defined, substantially parallel to the optical axis, between the central point 902 and the entrance pupil plane. The distance "D" may be relatively large, compared to the size of the entrance pupils of the viewer's eyes and/or compared to the size of the display device (not shown) that displays a hologram of an image to be viewed by the viewing system 910. For example, the distance "D" may be approximately 1000 millimetres (1000 mm).

It can be seen that the viewer's eyes 906, 908 are, naturally, spatially separated from one another. The separation between the entrance pupils of the viewer's eyes may be referred to as an "inter-pupil distance" (IPD). In the example shown in FIG. 9, the entrance pupil of the right eye 908 is displaced from the intersection of the optical axis and the entrance pupil plane in a positive (+) direction along the x axis whereas the entrance pupil of the left eye 906 is displaced from the intersection of the optical axis and the entrance pupil plane in a negative (−) direction along the x axis. Again, this is just one example and is non-limiting. The present inventors have recognised that control may be provided so that the different respective positions of the viewer's two eyes (and, correspondingly, the different respective locations of two or more entrance pupils within any multi-entrance pupil viewing system) may be accounted for, to ensure that no part of an image is received by both eyes at substantially the same time. As a reminder, the special type of hologram in accordance with this disclosure effectively divides or separates the image content (albeit in the hologram domain) by angle.

Figure 10:
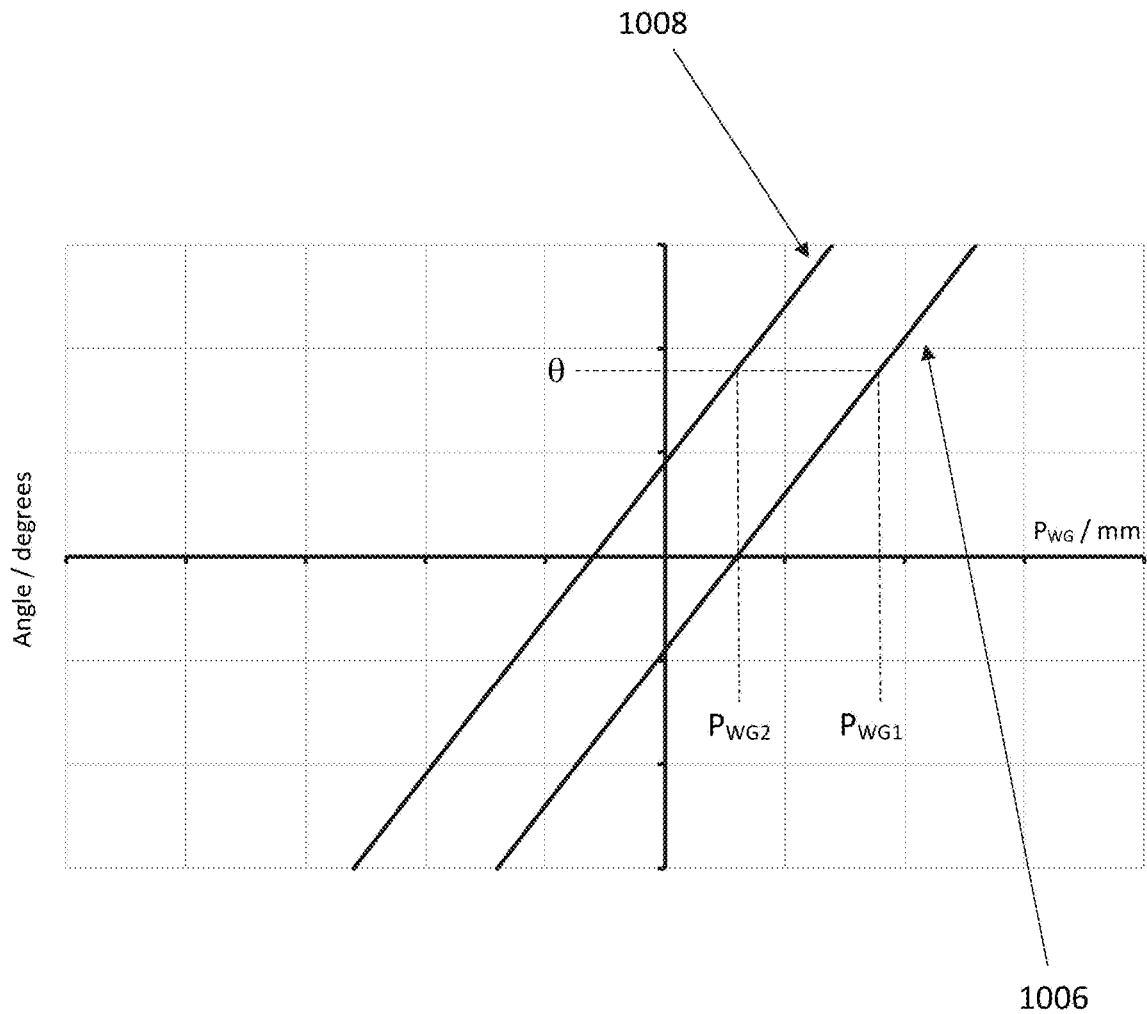
FIG. 10 comprises a graph showing a relationship between a light ray angle and position along the waveguide ($P_{WG}$) for the waveguide of FIG. 9.

FIG. 10 comprises a graph that illustrates the recognitions made by the present inventors, as applied to a display system or light engine, such as that shown in FIG. 7C, 8 or 9 herein. The graph shows the relationship between a position along the waveguide ($P_{WG}$) of a point on the large face of the waveguide, which faces a viewer or viewing system, and an angle from each eye to the point on the waveguide. In embodiments, the waveguide is tilted with respect to the display device (i.e. hologram) and/or viewing or entrance pupil plane of the viewing system.

The graph in FIG. 10 shows two lines—one 1006 for a first entrance pupil of a viewing system, such as the viewer's left eye, and the other 1008 for a second, different entrance pupil of the viewing system, such as the viewer's right eye. As can be seen, for any given angle of light, θ, there is a first position along the waveguide, $P_{WG1}$, from which the light is emitted in order to reach the left eye. For that same angle of light, θ, there is a second, different position along the waveguide, $P_{WG2}$, from which the light is emitted in order to reach the right eye. Therefore, both eyes will receive the same image content (i.e. angle of light) at substantially the same time but from different parts of the waveguide. This is the cause of a problem addressed by the inventors.

All of the rays (or ray bundles) that correspond to different respective parts of the image are emitted from multiple locations (i.e., from multiple "bounce points") on the waveguide. Therefore, if two or more rays of spatially modulated light that are emitted from the waveguide from different respective positions but at the same angle enters both entrance pupils substantially simultaneously, the image content received by both entrance pupils (e.g., by both the viewer's eyes) will be the same. This may lead to viewer confusion and may inhibit the quality of the image that the viewer sees or perceives.

The present inventors have therefore recognised that, according to embodiments, the light that is received by each entrance pupil of a multi-entrance pupil viewing system should be controlled. For example, the simultaneous receipt, by two or more entrance pupils of a multi-entrance pupil viewing system, of light of the same image content at the same angle should be reduced and at least in some cases should be eliminated. Moreover, the present inventors have recognised that two or more entrance pupils of a multi-entrance pupil viewing system should, at least in some cases, be prevented from both simultaneously receiving light of the same image content (i.e. light at the same specific range(s) of angle). The inventors' solution will be understood in relation to FIG. 11, which also shows first 1106 and second 1108 lines representing the light received by the left and right eyes, respectively, of a viewer according to an example.

Figure 11:
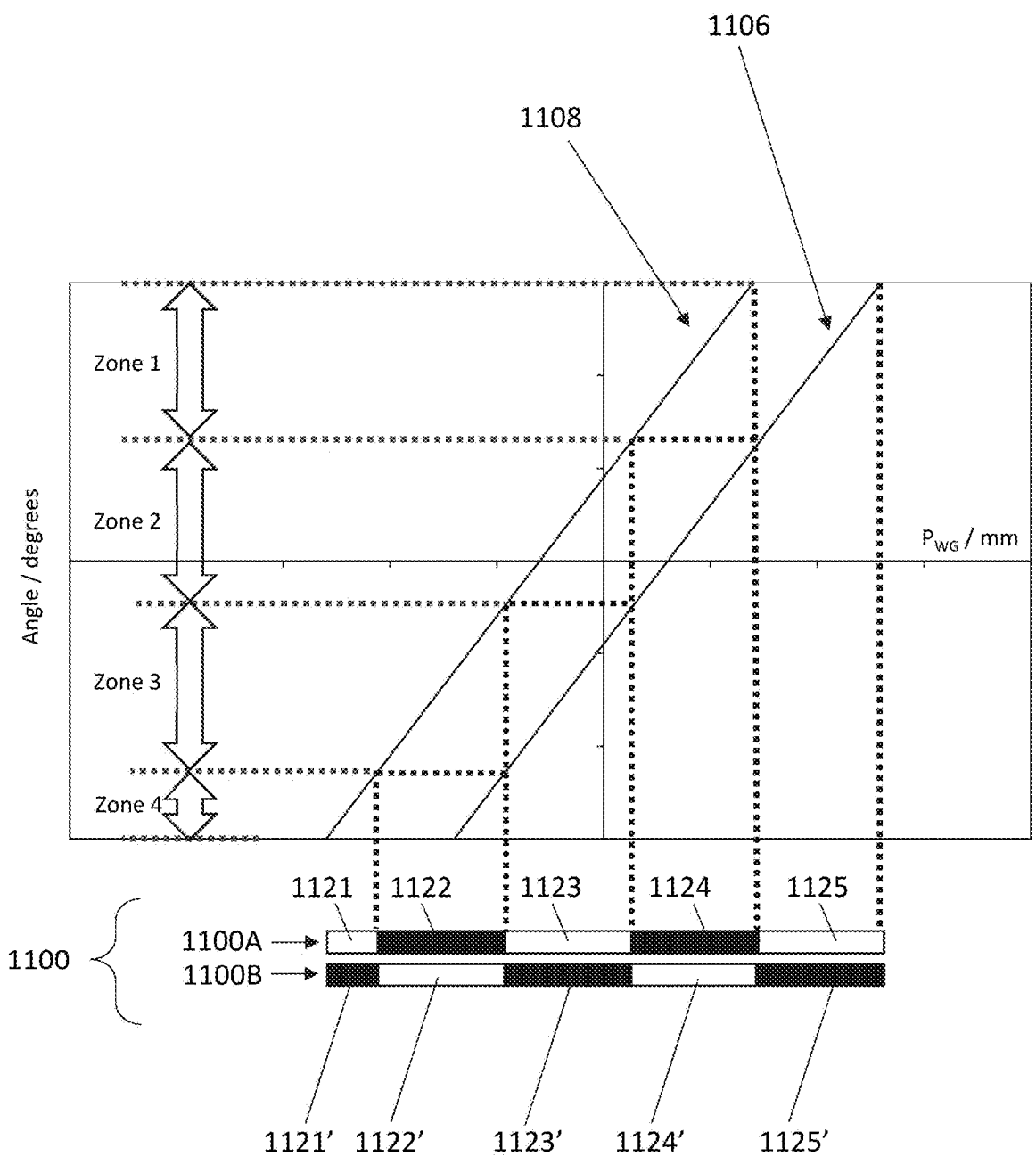
FIG. 11 shows a control device in accordance with embodiments, arranged relative to the graph of FIG. 10, for an image having 4 zones.

Each angle in FIG. 11 corresponds to a different part of the image owing to the special type of hologram employed in accordance with this disclosure. In summary, the inventors have identified from their analysis of this optical geometry that a plurality of angular ranges or "zones" (i.e. sub-areas) of the waveguide may be identified, in which only one of the eyes will receive the corresponding image content. For example, in zone 2 of the waveguide, the angular range of light receivable by the left eye is non-overlapping with the angular range of light receivable by the right eye. In any zone, the maximum angle receivable by one eye is less than the minimum angle receivable by the other eye such that there is no overlap. But the zones are seamlessly connected such that all image content (i.e. all angles) is delivered to the viewing system. Looking at this the other way, the range of angles associated with zone 2 in FIG. 11 is delivered to the first eye from a first sub-area (i.e. first range of $P_{WG}$) of the waveguide that is non-overlapping (but seamlessly connected) to a second sub-area (i.e. second range of $P_{WG}$) of the waveguide that delivers the same angular content to the second eye. The end of the first sub-area (e.g. the upper limit of $P_{WG}$ for the first eye) is immediately adjacent (i.e. seamlessly connected to) the start of the second sub-area (e.g. the lower limit of $P_{WG}$ for the other eye), or vice versa. In short, owing to the geometry of the system and nature of the hologram, the inventors identified that a plurality of zones (i.e. sub-areas) of the waveguide existed from which the two eyes would receive light encoded with different (and, crucially, non-overlapping) parts of the image. The person skilled in the art will appreciate that the approach described with reference to FIG. 11 approximates a complex optical system and, for example, the finite size of the entrance pupils may still allow some crosstalk of angular content between the eyes. However, the inventors have found that this method is highly effective at identifying light blocking configurations that significantly reduce the crosstalk between the two eyes whilst still delivering the full image content to both eyes.

In more detail, FIG. 11 shows, by way of example, 4 different zones, wherein each zone (zone 1, zone 2, zone 3, zone 4) defines a different respective range of angles of light, that will be emitted from the waveguide, towards the viewer. Each zone (zone 1, zone 2, zone 3, zone 4) corresponds to a different respective angular channel and thus corresponds to different respective image content. In other words, because of the unique manner in which the hologram has been calculated, each zone represents a different respective part of the image, and thus is said to correspond to different image content. The zones are adjacent to one another, and contiguous with one another, such that in combination they cover the full range of angles making up the image, and thus combine to provide all the image content necessary for the image to be holographically reconstructed by the viewer's brain, on receipt of the spatially modulated light. The reader will appreciate that the number of and position of the zones is variable, and FIG. 11 shows just one possible example.

The present inventors have recognised that, for every part of the image, and therefore for each zone, the light should preferably only be allowed to be received by one entrance pupil (i.e., by one of, not both of, the viewer's eyes), in order to avoid viewer confusion. Notably, the present inventors have devised a control device, at a selected location or locations between the waveguide and the viewer, in order to ensure that light from each part of the image (i.e. each angle) is only received by one of the viewer's eyes, at any given time. The control device may comprise one or more openings, or apertures, and one or more barriers or blockades. The control device may be referred to as being an "aperture" or a "waveguide aperture" which has closed portions and open portions. The waveguide aperture(s) may be configured so that the viewer's first eye receives angular content that cannot be received by the second eye, and vice versa. The control device may also be implemented as a light shuttering device comprising a plurality of elements that forms "shutters", which can be selectively opened or closed.

An example waveguide aperture 1100 is shown in FIG. 11, in a first phase 1100A and in a second phase 1100B. These phases correspond to "configurations" or "light blocking configurations" as described previously. The present disclosure is not limited to the particular configurations shown in the Figures. These are illustrative examples only.

The waveguide aperture 1100 is shown adjacent to a graph in FIG. 11, which is similar to the graph in FIG. 10, to show how the waveguide aperture 1100 would affect the light that would otherwise propagate towards a viewer's eyes, via a waveguide, from zones 1 to 4 of a hologram. Each phase 1100A, 1100B represents one possible configuration that may be applied, to ensure that only one eye receives the light of each zone at any given time. For each phase 1100A, 1100B, the waveguide aperture 1100 comprises "open" portions and "closed" portions, with each portion corresponding to a range (in millimetres, mm) of positions along the waveguide ($P_{WG}$), from which light might be emitted. In practice, the waveguide aperture 1100 may be physically located close to the waveguide, extending across light paths between the waveguide and the viewer, to selectively permit and block certain light paths as detailed below. For example, the waveguide aperture may be located immediately in front of the waveguide. In such an arrangement, the waveguide aperture may be tilted with respect to the entrance pupil plane, for example it may be substantially parallel to the elongate face of the waveguide. However other locations and orientations of waveguide aperture are contemplated, which would provide similar function.

A fixed waveguide aperture may be provided, corresponding to either phase 1100A, 1100B, wherein the fixed waveguide aperture is positioned between the waveguide and the viewer to permit light that is emitted from certain positions along the waveguide ($P_{WG}$) to reach the viewer and to block light from certain other positions along the waveguide ($P_{WG}$), as defined by the open (white) and closed (black) portions shown in FIG. 11. A plurality of different fixed waveguide apertures may be provided, wherein a selected one of the plurality may be disposed with the waveguide, at a given time, to provided selected control of the spatially modulated light between the waveguide and the viewer. Alternatively, a dynamically-reconfigurable waveguide aperture may be provided, which alternates between the first phase 1100A and the second phase 1100B. Taking each phase in turn, the waveguide aperture 1100 may be understood in more detail, as follows:

For the first phase 1100A, the waveguide aperture is spatially divided into 5 portions, each defining a range of positions along the waveguide ($P_{WG}$), wherein the portions are alternately open and closed. In more detail: a first open portion 1121 is defined, at the left-hand side of the Figure.

It will be appreciated that positional terms such as "left", "right" and so on are used only to aid understanding of the examples that are shown in the Figures and should not be regarded as limiting. The first open portion 1121 defines a range of positions along the waveguide ($P_{WG}$) for which the right eye receives the light of zone 4. The left eye does not receive any light from this range of positions. Moving from left to right, immediately adjacent the first open portion 1121 is a first closed portion 1122, which defines a range of positions along the waveguide ($P_{WG}$) for which the right eye could receive the light of zone 3. However, since it is a closed portion 1122, it ensures that the right eye will not receive any light from zone 3. Additionally, the first closed portion 1122 also covers a range of positions from which the left eye could have received light from zone 4. However, again, since it is a closed portion 1122, it ensures that the left eye will not receive any light from zone 4. Moving further to the right, immediately adjacent the first closed portion 1122 is a second open portion 1123, which defines a range of positions along the waveguide ($P_{WG}$) for which the left eye receive the light of zone 3. In addition, that same range of positions along the waveguide is the range for which the right eye receives light of zone 2. Moving further to the right, immediately adjacent the second open portion 1123 is a second closed portion 1124, which defines a range of positions along the waveguide ($P_{WG}$) for which the left eye would receive the light of zone 2. However, since it is a closed portion 1124, it ensures that the left eye will not receive any light from zone 2. Additionally, the second closed portion 1124 also covers a range of positions from which the right eye would receive light from zone 1. However, again, since it is a closed portion 1124, it ensures that the right eye will not receive any light from zone 1.

Finally, immediately adjacent the second closed portion 1124 is a third open portion 1125. It defines a range of positions along the waveguide ($P_{WG}$) for which the left eye receives the light of zone 1. The right eye does not receive any light from this range of positions. Therefore, when the waveguide aperture is in a configuration represented by the first phase 1100A, the light from each zone is permitted to enter one eye and is prevented from entering the respective other eye. Thus, duplication of received image content is avoided.

For the second phase 1100B, the waveguide aperture is again spatially divided into 5 portions, defining the same respective ranges of positions along the waveguide ($P_{WG}$) as the corresponding portions in the first phase 1100A do, but in the second phase 1100B, the portions are alternately closed and open when viewed from left to right, as defined in FIG. 11. In more detail: a first closed portion 1121' prevents light from zone 4 entering the right eye. It does not affect the left eye, because the left eye does not receive any light from this range of positions. Moving to the right, immediately adjacent the first closed portion 1121' is a first open portion 1122'. It allows light from zone 4 to enter the left eye and allows light from zone 3 to enter the right eye. Moving again to the right, immediately adjacent the first open portion 1122' is a second closed portion 1123'. It prevents light from zone 3 from entering the left eye and prevents light from zone 2 from entering the right eye. Moving again to the right, immediately adjacent the second closed portion 1123' is a second open portion 1124'. It allows light from zone 2 to enter the left eye and allows light from zone 1 to enter the right eye. Moving again to the right, immediately adjacent the second open portion 1124' is a third closed portion 1125'. It prevents light from zone 1 from entering the left eye. Thus, the functions of the two phases of the waveguide aperture are summarized in Table 1, below.

Embodiments describe an arrangement in which a first and second aperture configuration are opposite—i.e. perfectly complementary—by way of example only. It is not essential that the phases of the control device are perfectly complementary. In other embodiments described here, more complex configurations and phases are used particularly when the finite size of each entrance pupil is fully considered.

TABLE 1

| Waveguide aperture phase | Hologram zone | Eye through which light permitted | Waveguide aperture portion permitting light | Eye through which light blocked | Waveguide aperture portion blocking light |
| --- | --- | --- | --- | --- | --- |
| First 1100A | 1 | Left | Third open portion 1125 | Right | Second closed portion 1124 |
| First 1100A | 2 | Right | Second open portion 1123 | Left | Second closed portion 1124 |
| First 1100A | 3 | Left | Second open portion 1123 | Right | First closed portion 1122 |
| First 1100A | 4 | Right | First open portion 1121 | Left | First closed portion 1122 |
| Second 1100B | 1 | Right | Second open portion 1124' | Left | Third closed portion 1125' |
| Second 1100B | 2 | Left | Second open portion 1124' | Right | Second closed portion 1123' |
| Second 1100B | 3 | Right | First open portion 1122' | Left | Second closed portion 1123' |
| Second 1100B | 4 | Left | First open portion 1122' | Right | First closed portion 1121 |

The hologram is calculated such that it divides the image content of a target image by angle as described herein with reference to FIGS. 7A-C. A variety of different methods may be used to calculate such a hologram. In general, it may be said that the hologram is constrained in accordance with at least one entrance pupil of the viewing system. The characterizing feature of the hologram is the angular division of image content into channels. According to embodiments, the hologram is calculated using a point cloud method, as detailed above, which calculates the hologram using individual virtual image points of a virtual image that is to be generated. However, this method is described by way of example only and other methods of calculating a hologram characterized by the angular channeling of image content may be used. In embodiments utilizing the non-limiting, example point cloud method, each virtual image point may correspond to one light ray angle of the light between the display device and an entrance pupil of the viewing system. Each virtual image point may be regarded as an individual image component. In embodiments, a zone of the virtual image may comprise a single virtual image point or a plurality of virtual image points. In embodiments, two or more neighbouring virtual image points may be comprised within a zone of the virtual image, wherein the angular range for that zone comprises all the angles that respectively correspond to the individual virtual image points that are comprised within the zone.

To successfully control the content that reaches each eye (or entrance pupil) of a viewer (or viewing system), wherein each eye (or entrance pupil) occupies a different respective viewing position, each portion of the waveguide aperture disclosed herein (i.e. each zone) defines a maximum light ray angle and minimum light ray angle that can be received from each viewing position—e.g., from each eye, when the viewing system is a human viewer with two eyes. To avoid overlap of received hologram content between the viewing positions (e.g., between the two eyes), for each zone, the maximum light ray angle of the first eye position is less than the minimum light ray angle of the second eye position. If the two viewing positions are configured to received content from two adjacent zones, the maximum light ray angle of the first eye position is substantially equal to the minimum light ray angle of the second eye position. For example, the waveguide aperture may be configured so that the first viewing position receives spatially modulated light corresponding to content in an angular range up to and including its maximum light ray angle ($\theta_{max1}$) and the second viewing position receives spatially modulated light corresponding to content in an angular range above, but not equal to $\theta_{max1}$, up to a maximum light ray angle of the second eye position ($\theta_{max2}$).

According to embodiments, the "target image", for which a hologram is calculated, and which is holographically reconstructed, according to the present disclosure, is different for each eye. The holograms corresponding to the image, which are calculated separately for each eye, may thus in fact each be a hologram of a different image. In other words, the hologram calculated for the left eye is a hologram corresponding to the image when viewed from the perspective of the left eye and, conversely, the hologram for the right eye is a hologram corresponding to the image when viewed from the perspective of the right eye.

Thus, the present inventors have recognised that, the image content comprised within each zone may be different for each eye (or, for each aperture, of any other multiple aperture viewing system). Therefore, according to embodiments, the waveguide aperture disclosed herein may be configured to supply light of all zones to each eye, within a narrow time window, so that the brain (or processor associated with a non-human viewing system) perceives that each eye has received all of the hologram content for its respective image, substantially simultaneously.

According to embodiments, the waveguide aperture may be dynamically configurable, and/or there may be more than one waveguide aperture, light shuttering device or other control device provided, wherein a suitable drive controller (e.g. as described below) can control switching between different respective configurations thereof, and/or switching between the different control devices, on a dynamic basis. Preferably, this should be done very quickly, for example more quickly than the typical integration time for a human eye. The switching enables all of the spatially modulated light that is emitted by the control device in both phases/configurations to be received by the viewer within a very short time window, such that the viewer perceives that it has all been received simultaneously.

The waveguide aperture 1100 may be controlled to switch between the first and second phases quickly, for example more quickly than the typical integration time of the human eye, so that the respective image contents received by the viewer in each phase are interlaced with one another, as described in GB2108456.1. Hence, the viewer perceives that they have seen the full image with both eyes, each from its own unique perspective according to its position. However, the viewer does not perceive the image deterioration, nor do they encounter any confusion, that actually receiving common, or overlapping, image content at both eyes at the same time at the same angle would have caused. Hence, the control device works in combination with the calculated hologram(s), as described herein, to create clear and accurate holographically constructed images for the viewer. It does so in a simple yet effective way.

The inventors found that the working embodiments described above can be adequately determined by geometry based on the centre of each entrance pupil. In a further improvement described in GB2108456.1 with reference to FIGS. 26 to 30 thereof, the inventors considered the finite size of the entrance pupils. In accordance with these embodiments, image quality is further improved and image crosstalk between the plural viewing systems is further reduced or even eliminated. The person skilled in the art will appreciate how the method described below can be used to dynamically reconfigure the control device and aperture arrangement in real-time in response to a change of eye or head position and/or pupil size, for example. The aperture configuration provided by the control device is software reconfigurable and so the system disclosed herein may also adjust itself in response to parameters of the viewing system such as the separate between the two viewing systems—e.g. the interpupil distance of a human viewer.

In some embodiments, a measurement is made of the pupil diameter(s) (e.g. by an eye tracking system) and this is used as part of the control system for the shuttering. For example, a drivers' pupil may vary considerably. When the ambient light is bright, the pupil diameter will be smaller. An advantage of the system disclosed herein is that, under bright conditions when the pupil diameter is relatively small (e.g. 2 mm), less "closed" aperture area is required to eliminate eye crosstalk. This is advantageous because it means the overall efficiency (amount of light propagated towards the viewer) is relatively high. There is therefore excellent synergy between the shutter system of the present disclosure and image display in particular head-up display in a vehicle.

In accordance with further embodiments, a more complex light shuttering scheme may be employed, in which the size of the shutter zones may change during the operation of the dynamic shutter. In addition, the position of the shutter zones may change or be reconfigured during operation. For example, the position of the boundaries of the shutter zones of a configuration may be change according to the eye position—corresponding to the centre of each entrance pupil on which the geometry is based—determined by an eye-tracking device. Any number of different shutter schemes may be implemented in order to ensure that no part of an image is received by plural viewing positions (e.g. eye positions) at the same time. Again, this is achieved by ensuring that each light angle from the waveguide pupil expander only reaches one viewing position (e.g. one eye) at any one time. For example, three different shutter configurations may be implemented in sequence (e.g. cycled) during operation, as described in co-pending GB2108456.1 with reference to FIGS. 28 to 30 thereof.

Based on this geometry, the inventors have determined a dynamic shuttering scheme that eliminates crosstalk between the two eyes having a finite pupil size. In this embodiment, the dynamic shuttering scheme comprises three configurations (phases or stages). That is, three, different shutter arrangements/patterns are used to reconstruct each hologram. The three shutter arrangements are formed time-sequentially. It may therefore be said that the different arrangements are time-interlaced. However, the present disclosure is not limited to three different shutter arrangements and any number of different shutter arrangements may be conceived within the scope of this disclosure.

The control device disclosed herein may take any number of different forms. In some embodiments, as described below with reference to FIGS. 12 and 13, the control device comprises a light shuttering device formed as a plurality, such as a 2D array, of individually controllable light receiving/processing elements such as pixels. In particular, the light shuttering device may comprise a pixelated liquid crystal device or display. In some embodiments, the elements or pixels are operable in contiguous groups to form the transmissive and non-transmissive shutter zones disclosed herein. Each group of pixels may be switchable between a first optical mode (e.g. transmissive or optically transparent) and a second optical mode (e.g. reflective or optically absorptive/opaque). The person skilled in the art is familiar with how a pixelated display device may be controlled in order that the size and position of groups or zones of pixels—each zone having a different response to light— may be changed in operation such as in real-time. Each zone is larger than the pixel size of the device. Each zone may therefore comprise a plurality of pixels. The person skilled in the art is equally familiar with how optical components such as polarisers and waveplates may be implemented in conjunction with a pixelated liquid crystal device to provide a reconfigurable light shuttering device. By way of example only, the control device may utilize polarization selection but other schemes based on other characterizing properties of light are equally applicable. In some embodiments, the control device comprises a pixelated liquid crystal display and, optionally, other optical elements collectively configured to transmit light having a first polarization and absorb or reflect light having a second polarization, optionally, wherein the first polarization and second polarization are opposite or complementary. For the avoidance of doubt, any number of different optical systems may be used to form the control device depending on the characteristics, such as polarization and wavelength, of the light forming the image and the present disclosure is not therefore limited by the construction of the control device. It will therefore be understood that the control device disclosed herein is defined by its functionality rather than its structure.

The control device is dynamically reconfigurable. In some embodiments, the control device is pixelated. That is, the control device comprises an array of individually controllable pixels. Each pixel may comprise, for example, liquid crystal configurable between a transmissive state and non-transmissive state. Any imperfection in alignment between the edge of a pixel and the ideal aperture zone edge, identified as per this disclosure, can be dealt with by either letting through too much or too little light. That is, by either "opening" another line of pixels or "closing" one more line of pixels in the zonal configuration. In embodiments comprising three or more configurations (e.g. when the finite size of each entrance pupil is fully considered) the control device has sufficient resolution or number of pixels such that the pixel at the interface can always be made to block the light.

As described above, the control device, such as a light shuttering device forming a waveguide aperture, needs to switch between configurations quickly. This is because, when it is in a transition between configurations, the light source illuminating the display device should be shut off to prevent uncontrolled emission of light from the waveguide. In embodiments implementing a gated laser light source for illuminating the display device, it is desirable that the shuttering device updates entirely within the time that the laser diode would already be "off" for laser gating (i.e. during frame update of the display device). In this way, there is no reduction in allowable laser-on time for illuminating the display device.

The present disclosure proposes a control device configured as a plurality of pixels, such as a one-dimensional array of pixels, wherein each pixel forms a "shutter" for selectively blocking light from a corresponding transmission point along the length of the waveguide. Thus, the control device is referred to as a "light shuttering device". In embodiments, the pixels are liquid crystal cells, operable in two optical states. In one optical state, the liquid crystal cell blocks (e.g. absorbs or reflects) incident light from a corresponding position (or region) on the waveguide, so as to prevent transmission of light. In the other optical state, the liquid crystal cell is transparent, so that incident light from a corresponding position (or region) on the waveguide is transmitted therethrough. The pixels of the light shuttering device are controlled by drive signals, as well known in the art. In embodiments, all the pixels of the light shuttering device are directly driven by one of two drive signals for driving the pixel to a respective one of the first and second optical states.

Figure 12:
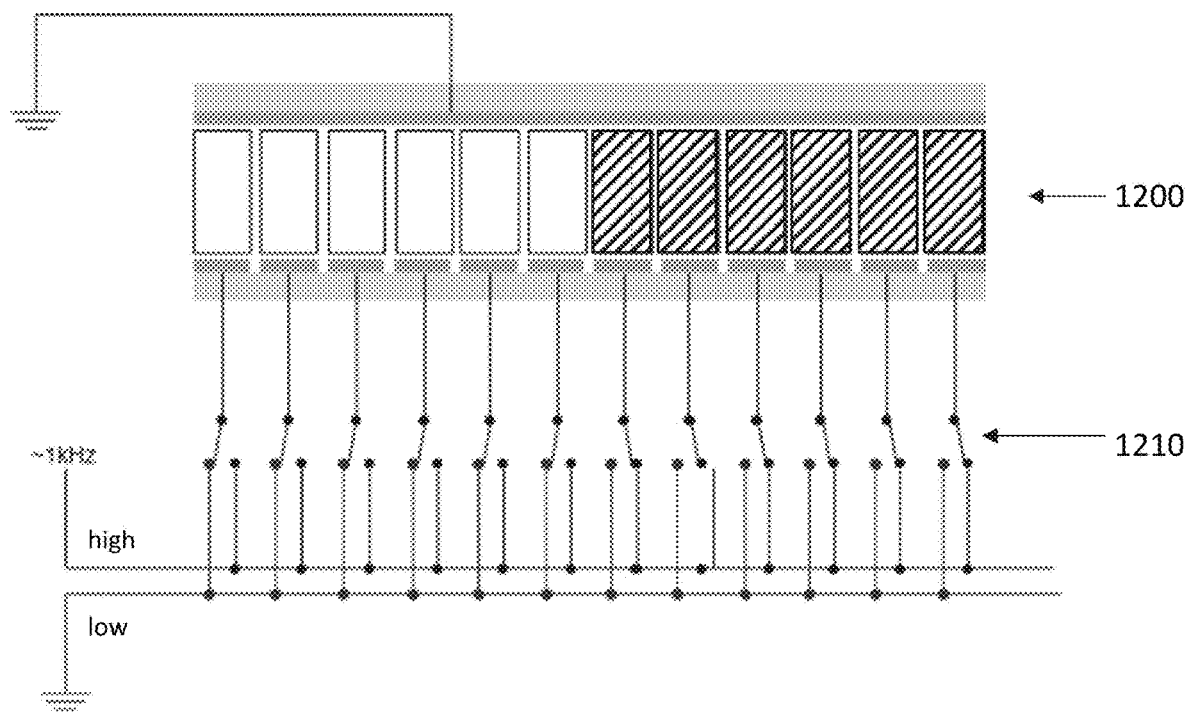
FIG. 12 shows a driving scheme for modifying the configuration of a control device comprising a light shuttering device, in accordance with embodiments.

FIG. 12 shows a driving scheme for switching the configuration of a light shuttering device 1200 comprising a one-dimensional array of liquid crystal cells forming pixels. A drive circuit comprises a plurality of switches 1210, where each switch is associated with an individual pixel of the light shuttering device. It will be appreciated that, in other arrangements, each switch may be associated with an independently controllable group of pixels. Each switch is selectively connectable to either a first drive signal or a second drive signal. In the illustrated arrangement, the first drive signal is a "low" signal, in which the switch is connected to the "low" voltage line or ground for driving the corresponding pixel(s) to a transparent state (illustrated as white/ unshaded) in order to "open" the shutter, and the second drive signal is a "high" signal, in which the switch is connected to the "high" voltage line for driving the corresponding pixel(s) to an opaque or reflective state (illustrated as black/shaded) in order to "close" the shutter. Other arrangements are possible and contemplated.

Accordingly, in the driving scheme of FIG. 12, each pixel of the light shuttering device 1200 is directly driven with a "low" or "high" drive signal under the control of a corresponding switch 1210. Directly driving the pixels maximises the contrast between transparent and opaque states in comparison to a driving scheme in which the pixels are passively driven. Furthermore, driving each pixel independently of other pixels maximises the flexibility for defining the groups of pixels forming the different "zones" of the light shuttering device, as disclosed herein. For example, the boundary between zones may need to be changed in response to changes in the eye position of a viewer's eyes within the eye-box, corresponding to the centre of each entrance pupil on which the geometry is based, as described above. The position of the viewer's eyes may be tracked using an eye-tracking device as well known in the art.

In some embodiments, the switches are arranged externally to the light shuttering device, such as on an external PCB. In other embodiments, the switches may be implemented as part of the pixel circuit associated with each of the pixels of the light shuttering device. For instance, a switch may be implemented within each pixel circuit that is integrated on the substrate of a thin film transistor liquid crystal display (TFT-LCD) device that forms the light shuttering device.

However, for some liquid crystal cells, such as the pixels of a thin-cell liquid crystal device, the switching time period to switch in a direction from one state to the other optical state is longer than the switching time period to switch in the other direction. For example, the switching time period is longer when the liquid crystal cell "relaxes" to its new state compared to when it is "driven" to its new state. In embodiments, the time period to switch from a second optical state (shutter is "closed") to a first optical state (shutter is "open") is longer than the time period to switch from the first optical state (shutter is "open") to the second optical state (shutter is (closed"), such as when the liquid crystal cell "relaxes" to the transparent/open state but is driven to the opaque/closed state.

The present disclosure addresses the technical problem that the switching time period for pixels of a light shuttering device, when switching in a direction whereby the liquid crystal cell "relaxes" to its new state, is too long for application requirements, such that the performance is compromised as described above.

FIG. 13 shows a system for driving a light shuttering device 1300 in accordance with embodiments, which enables the configuration thereof to be updated more quickly and efficiently. The light shuttering device 1300 comprises a one-dimensional array of pixels, as described above with reference to FIG. 12

The system, which may be referred to as a "drive circuit", comprises a drive controller 1330, a multiplexing circuit 1320 and a switching circuit 1310. The switching circuit 1310 comprises a plurality of switches, such as digital switches. In the illustrated arrangement, the number of switches of the switching circuit is the same as the number of pixels of the light shuttering device 1300. The output of each switch of the switching circuit 1310 is connected to a corresponding pixel of the light shuttering device 1300, so as to independently drive the pixel with either a "low" drive signal or a "high" drive signal.

The drive controller 1330 is arranged to control the switching of the pixels of the light shuttering device 1300 by the switching circuit 1310, so as to change the configuration thereof, during an update cycle. The drive controller 1330 provides control signals to the switching circuit 1310 to control the selection of the updated (high or low) drive signal to be provided to each pixel, and the timing, sequence and order of the update of each pixel of the light shuttering device 1300. In the illustrated arrangement, a multiplexing circuit 1320, comprising one or more stages of multiplexers, is used for sequentially routing the control signals from the drive controller 1330 to the plurality of switches of the switching circuit 1310. The skilled person will appreciate that other arrangements may be used, instead of a multiplexing circuit 1320, for signal routing. The drive controller 1330 is typically arranged to receive inputs from the display system so as to generate the required control signals for reconfiguring the light shuttering device 1300 for each update cycle at the required time (e.g. during a frame update of the display device). For example, the drive controller 1330 may receive signals from a hologram engine or display driver of the display device, indicating an update of a frame or subframe of the display device. Additionally, or alternatively, the drive controller 1330 may receive signals from a light source controller indicating when the light source is turned on and/or off. The drive controller 1330 may receive signals from an external processor indicating the updated configuration, or configuration changes, required for the light shuttering device 1300. Alternatively, the drive controller 1330 itself may determine the required configuration, or configuration changes. In the latter case, the drive controller 1330 may receive signals from an eye tracking system indicating changes in the viewer's eye position, in order to determine the position of the zones as described above. The drive controller 1330 may be implemented as an external processor or circuit, such as an FPGA.

In order to ensure that overall time period for switching all the pixels of the light shuttering device 1300 during an update cycle is within a required time period, such as less that the time period during which the light source is turned off during a frame update of the display device, the drive controller 1300 is arranged to provide the control signals to the plurality of switches in an optimally ordered sequence. In particular, the drive controller 1330 is arranged to determine an optimised sequence that defines the order in which the control signals are provided to the plurality of switches based on the change of state of the corresponding plurality of pixels by the configuration update. In embodiments, the drive controller 1330 identifies the pixels that are to be driven in a direction that takes longer to fully switch between states (e.g. the direction where the pixel "relaxes" into the new state) and determines the sequence of control signals such that the identified pixels are switched first—before the other pixels. Typically, the sequence of control signals, for the switches that are associated with the identified pixels (e.g. zones) that are to be switched first, is such that the drive signals drive consecutive pixels of the array of pixels of the light shuttering device 1300. Thus, the identified pixels (zones) are sequentially driven in turn (i.e. one-by-one) from a first end of the array to a second end of the array. Once all the identified pixels have been driven, the other pixels (zones) are then sequentially driven in turn (i.e. one-by-one) from the first end of the array to the second end of the array. In this way, all the pixels that will take longer to reach a new stable state will be fully switched by the end of the update cycle.

In some embodiments, each of the plurality of switches of the switching circuit 1310 may comprises a digital switch having inputs connected to the first and second voltages corresponding to the high and low drive signals. A control input of each digital switch is used to control the selection between the high and low drive signals output by the switch. Accordingly, in these embodiments, the control signals are sequentially received as control inputs to the digital switches in order to control the output of the required one of the high and low signals to sequentially drive their respective pixels of the light shuttering device. Thus, each digital switch is addressed one at a time, in sequence. However, since the total update time—the time for driving all the pixels of the light shuttering device to update the configuration thereof—is limited, as discussed above, the control signal is applied to each switch for only a very short time, after which a floating voltage may be present at the control input. In particular, the inventors found that a digital switch may not be able to reliably hold its state, so as to output the correct drive voltage to its respective pixel, when the control signal is applied for such a short time. In order to address this issue, the inventors propose providing a "sample and hold" capacitor in the signal path between the drive controller 1330/multiplexing circuit 1320 and the control input of each digital switch of the switching circuit 1310. The sample and hold capacitor holds the voltage of the applied control signal received from the drive controller 1330/multiplexing circuit 1320 for a longer time period, so that the digital switch operates reliably.

The examples described hereabove should not be regarded as limiting. For example, the viewing system may have more than two viewing apertures, or entrance pupils. For example, it is possible to divide an image (and, correspondingly, a calculated hologram and the resulting holographically reconstructed image) into any number of zones, and thus to produce any number of corresponding angular channels of spatially modulated light. For example, the control device has been described as switching between first and second phases, but it could be configured to switch between more than two phases. For example, the control may have four phases. According to an embodiment, a phase (for example, each phase) of the control device may enable light to be delivered only to one eye (or viewing aperture). According to an embodiment, a phase (for example, each phase) of the control device may enable light to be delivered only to more than one eye (or, more than one viewing aperture).

The number of zones and/or the size of zones for which image content is received need not be the same for each phase. In other words, some phases of the control device may deliver more image content than some respective others. Similarly, both eyes need not receive the same amount of image content as one another in each phase, or in total, when multiple phases of the control device are interlaced with one another. For example, it may be possible for one eye to see more image content than the respective other, dependent on their relative positions and/or on other factors.

A display system comprising a control device such as a waveguide aperture as described herein may be configured to display a plurality of different images, one after another and/or at different respective times. Thus, a display device within such a system may be configured to display different respective holograms, sometimes in rapid succession. Different images may have different respective numbers of zones. Moreover, the sizes of the zones may differ between different respective images. Similarly, the light rays of the zones of one image may be defined by different respective angles to the light rays of the zones of a second, different image. The control device may be configured to be dynamically adaptable, to accommodate changes in the number and/or sizes of the zones. In other words, the precise positions along the waveguide ($P_{WG}$) at which the control device changes from being open to being closed, and vice versa, may not be fixed. Instead, the control device may be configurable to dynamically change the positions along the waveguide ($P_{WG}$) at which it changes from being open to being closed. Thus, the total number of open and closed portions provided by the control device may be varied. The individual sizes of one or more of those portions may also be varied.

The system may be configured to display a sequence of images such as a video rate sequence of images. Each image may correspond to a frame of a sequence of frames having a frame rate such as 50 or 60 Hz. Each frame may comprise a plurality of sub-frames. The sub-frame rate may be 4 or 8 times the frame rate, for example. The displayed hologram may be changed for each successive sub-frame. Each sub-frame may be considered an individual display event. Each sub-frame may correspond to the image or at least a part of the image. Whilst embodiments have shown light being delivered to both eyes each display event, the present disclosure is not limited in this respect. For example, the light engine may be configured to deliver light to only one eye/entrance pupil per display event. The configuration of the waveguide aperture (i.e. the size and/or distribution of open and closed apertures/openings) may change every display event or every n display events, wherein n is an integer. Likewise, whilst described embodiments have shown adjacent image content being delivered through each aperture/opening during a display event, the present disclosure is not limited to such a situation and the image content delivered through each aperture may not be adjacent image content. In some embodiments, only one angular range of light is delivered to one eye per display event/aperture configuration. In some embodiments, the control system is configured to deliver light to each eye/entrance pupil in turn.

As has been described earlier in the present disclosure, a hologram of a target image may be calculated for a particular size and position of a viewing aperture—e.g., for a particular size and position of the entrance pupil of a viewer's eye. If a constraint such as entrance pupil diameter, or position changes, the hologram may be recalculated, even if the target image that is to be reconstructed at that time (and, hence, the image content that the viewer will see or perceive) remains the same. Each hologram need not have the same number or size of zones, even when two holograms represent the same target image.

The control device, such as a light shuttering device, has been described in particular in the context of the propagation of a "channeling" hologram. However, it should be clear that the advantages of the control device (in particular, the provision of a light control device having a fast update time that compensates for slower state changes based on switching order) are applicable in other contexts also.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode.

The system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The following numbered clauses are also disclosed:

Item 1. A light shuttering device comprising:
a plurality of liquid crystal cells, wherein each liquid crystal cell is operable in a first optical state or a second optical state in response to a respective first or second drive signal;
a drive circuit comprising: a plurality of switches, wherein each switch is arranged to output the respective first or second drive signal to a respective liquid crystal cell; and a drive controller arranged to sequentially update the output of each switch during an update cycle; wherein the drive circuit is arranged to determine the order in which the switches are sequentially updated during an update cycle based on any changes to the respective drive signals that will be made during the update.

Item 2. A device as defined in item 1 wherein the liquid crystal cells take longer to switch from the second optical state to the first optical state than from the first optical state to the second optical state, and the drive circuit is arranged during an update cycle to update the output of any switches that will be changed from the second drive signal to the first drive signal before any other switches.

Item 3. A device as defined in any preceding item wherein the drive circuit is arranged during the update cycle to update the output of any switches that will be changed from the first drive signal to the second drive signal after all switches that will be changed from the second drive signal to the first drive signal have been updated.

Item 4. A device as defined in any preceding item wherein the plurality of switches comprises a plurality of digital switches, wherein each digital switch comprises a first input arranged to receive the first drive signal and a second input arranged to receive the second drive signal.

Item 5. A device as defined in item 4 further comprising a capacitor associated with each digital switch, wherein each capacitor is arranged to receive a signal from the drive controller during an update cycle and to provide a control input to the respective digital switch to selectively output the respective first or second drive signal to a respective liquid crystal cell, wherein the capacitor is arranged to hold the control input to the digital switch between updates.

Item 6. A device as defined in any preceding item wherein the drive circuit further comprises a multiplexing circuit for sequentially routing control signals from the drive controller to update the output of each of the switches during an update cycle.

Item 7. A device as defined in any preceding item wherein the liquid crystal cells are arranged in a one-dimensional array.

Item 8. A device as defined in any preceding item arranged to restrict the area of the output face of an optical replicator that is visible from a viewing plane, optionally, wherein the optical replicator is arranged to output a plurality of replicas of a hologram.

Item 9. A device as defined in any preceding item wherein the light shuttering device is disposed between a display device and a viewer.

Item 10. A device as defined in item 9 wherein at least one update cycle—optionally, a plurality of update cycles—is completed within the integration time of the human eye.

Item 11. A device as defined in item 9 or 10 wherein an update cycle is initiated if a change to the viewing position of the viewer is detected.

Item 12. A light engine arranged to form an image visible from a viewing window, wherein the light engine comprises:
a display device arranged to display a hologram of the image and spatially modulate light in accordance with the hologram, wherein the hologram is configured to angularly distribute spatially modulated light of the image in accordance with position of image content, such that angular channels of the spatially modulated light correspond with respective continuous regions of the image;
a waveguide pupil expander arranged to receive the spatially modulated light and provide a plurality of different light propagation paths for the spatially modulated light from the display device to the viewing window; and
the light shuttering device of any preceding claim, wherein the light shuttering device is disposed between the waveguide and the viewing window.

Item 13. A light engine as defined in items 12 wherein at least one liquid crystal cell of the plurality of liquid crystal cells of the light shuttering device forms an aperture arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image.

Item 14. A light engine as defined in items 13 wherein the first region and second region are adjacent regions of the image.

Item 15. A light engine as defined in any of items 12 to 14 wherein adjacent angular channels of the spatially modulated light correspond to adjacent regions of the image.

Item 16. A light engine as defined in any of items 12 to 13 wherein the first region and second region of the image are substantially non-overlapping.

Item 17. A light engine as defined in any of items 12 to 15 wherein the image is a virtual image perceived upstream of the display device.

Item 18. A light engine as defined in any of items 12 to 16 wherein the light shuttering device is coupled to an output face of the waveguide pupil expander.

Item 19. A light engine as defined in any of items 12 to 17 wherein the light shuttering device restricts the area of the output face of the waveguide that is visible from the viewing window.

Item 20. A light engine as defined in any of items 12 to 18 wherein the waveguide pupil expander and viewing window are non-parallel.

Item 21. A light engine as defined in any of items 12 to 19 wherein the control device comprises at least one opening—such as a plurality of openings—wherein each opening provides the first viewing position and/or the second viewing position with a respective channel of spatially modulated light, such that different image content is delivered, respectively, to the first and second viewing positions at substantially the same time.

Item 22. A light engine as defined in item 21 wherein the respective channels are non-overlapping but continuous.

Item 23. A light engine as defined in item 21 or 22 wherein the control device is configured such that each opening is switchable between an open position and a closed position such that a plurality of different control device configurations is provided in which each control device configuration comprises an alternating sequence of open and closed openings.

Item 24. A light engine as defined in item 23 wherein the control device is configured to provide a first control device configuration at a first time and a second control device configuration at a second time, wherein the first control device configuration and second control device configuration are complementary.

Item 25. A light engine as defined in item 24 wherein the time interval between the first time and second time is less than the integration time of the human eye.

Item 26. A light engine as defined in any of items 12 to 25 wherein a first control device configuration provided by the control device delivers light modulated in accordance with first and third image zones of the image to the first viewing position and light modulated in accordance with second and fourth image zones of the image of the image to the second viewing position, wherein the first to fourth zones are ordered, contiguous areas of the image.

Item 27. A light engine as defined in any of items 12 to 26 wherein a second control device configuration provided by the control device delivers light modulated in accordance with second and fourth image zones of the image to the first viewing position and light modulated in accordance with the first and third of the image to the second viewing position.

Item 28. A light engine as defined in item 26 or item 27 wherein the image content of any one of the first to fourth image zones as delivered to the first viewing position is non-identical to the image content of a corresponding one of the first to fourth image zones as delivered to the second viewing position.

Item 29. A light engine as defined in any of items 12 to 28 wherein the first viewing position and second viewing position are first and second eye positions of a viewer, and the viewing window is an eye-box.

Item 30. A light engine as defined in any of items 21 to 29 wherein a size and/or a location, within the control device, of at least one of the openings is dynamically variable.

What is claimed is:

1. A light shuttering device comprising:
a plurality of liquid crystal cells, wherein each liquid crystal cell is operable to switch between a first optical state or a second optical state in response to a respective first or second drive signal, and wherein individual liquid crystal cells take longer to switch from the second optical state to the first optical state than from the first optical state to the second optical state;
a drive circuit comprising: (i) a plurality of switches, wherein each switch is arranged to output the respective first or second drive signal to a respective liquid crystal cell, and (ii) a drive controller arranged to sequentially update the output of each switch during an update cycle; and
wherein the drive circuit is arranged to determine an order in which the switches are sequentially updated during an update cycle based on any changes to the respective drive signals that will be made during the update where the order in which the switches are sequentially updated during an update cycle comprises updating the output of switches that will be changed from the second drive signal to the first drive signal before updating the output of any other switches.

2. The light shuttering device of claim 1, wherein the order in which the switches are sequentially updated during an update cycle comprises updating the output of any switches that will be changed from the first drive signal to the second drive signal after all switches that will be changed from the second drive signal to the first drive signal have been updated.

3. The light shuttering device of claim 1, wherein the plurality of switches comprises a plurality of digital switches, wherein each digital switch comprises a first input arranged to receive the first drive signal and a second input arranged to receive the second drive signal.

4. The light shuttering device of claim 3, further comprising a capacitor associated with each digital switch, wherein each capacitor is arranged to receive a signal from the drive controller during an update cycle and to provide a control input to the respective digital switch to selectively output the respective first or second drive signal to a respective liquid crystal cell, wherein the capacitor is arranged to hold the control input to the digital switch between updates.

5. The light shuttering device of claim 1, wherein the drive circuit further comprises a multiplexing circuit for sequentially routing control signals from the drive controller to update the output of each of the switches during an update cycle.

6. The light shuttering device of claim 1, wherein the liquid crystal cells are arranged in a one-dimensional array.

7. The light shuttering device of claim 1, wherein the light shuttering device is arranged to restrict an area of an output face of an optical replicator that is visible from a viewing plane, and wherein the optical replicator is arranged to output a plurality of replicas of a hologram.

8. The light shuttering device of claim 1, wherein the light shuttering device is disposed between a display device and a viewer.

9. The light shuttering device of claim 1, wherein at least one update cycle is completed in one of (i) less than about 100 milliseconds or (ii) less than about 200 milliseconds.

10. The light shuttering device of claim 1, wherein an update cycle is initiated if a change to a viewing position of a viewer is detected.

* * * * *